(12) United States Patent
Gil et al.

(10) Patent No.: US 12,195,116 B2
(45) Date of Patent: Jan. 14, 2025

(54) SURFACE TRAVERSING ENGINE

(71) Applicant: HYSTRIX TECHNOLOGIES LTD., Padres Hana-Karkur (IL)

(72) Inventors: Ehud Gil, Mishmarot (IL); Yehuda Spira, Kiryat Tivon (IL); Eli Pardo, Pardes Hana-Karkur (IL)

(73) Assignee: HYSTRIX TECHNOLOGIES LTD., Pardes Hana-Karkur (IL)

( * ) Notice: Subject to any disclaimer, the term of this patent is extended or adjusted under 35 U.S.C. 154(b) by 523 days.

(21) Appl. No.: 17/626,527

(22) PCT Filed: Jul. 28, 2020

(86) PCT No.: PCT/IL2020/050834
§ 371 (c)(1),
(2) Date: Jan. 12, 2022

(87) PCT Pub. No.: WO2021/019535
PCT Pub. Date: Feb. 4, 2021

(65) Prior Publication Data
US 2022/0242505 A1 Aug. 4, 2022

(30) Foreign Application Priority Data

Jul. 28, 2019 (IL) .......................................... 268296

(51) Int. Cl.
*B62D 57/02* (2006.01)
*B08B 9/051* (2006.01)
*F16L 55/34* (2006.01)

(52) U.S. Cl.
CPC .............. *B62D 57/02* (2013.01); *F16L 55/34* (2013.01); *B08B 9/051* (2013.01)

(58) Field of Classification Search
CPC .......... B62D 57/00; B62D 57/02; F16H 55/34
See application file for complete search history.

(56) References Cited

U.S. PATENT DOCUMENTS

| 6,431,079 B1* | 8/2002 | Appleton ................ F16L 55/40 |
| | | 104/138.2 |
| 9,657,884 B1* | 5/2017 | Carte ...................... F16L 55/44 |

FOREIGN PATENT DOCUMENTS

| CN | 108263504 A | 7/2018 | |
| CN | 109047202 A | * 12/2018 | ........... B08B 9/0492 |
| DE | 202010005845 U1 | * 11/2010 | ............. B08B 9/049 |

OTHER PUBLICATIONS

Wang et al., "A Bristle-Based Pipeline Robot For Illconstraint", IEEE/ASME Transactions On Mechatronics, p. 383-392, Mar. 13, 2008.

(Continued)

*Primary Examiner* — Kevin Hurley
(74) *Attorney, Agent, or Firm* — Manelli Selter PLLC; Edward Stemberger

(57) ABSTRACT

A device for moving across a surface, comprising at least one section. Each section comprises a core and a drive sleeve, with the drive sleeve at least partially overlapping the core and reversibly movable relative to the core. In each section, the drive sleeve has at least one row of whiskers and the core has at least one row of whiskers, the whiskers pointing outward from the section, the whiskers capable of supporting at least the weight of the section. For each section, the reciprocal motion of the core and drive sleeve is driven by a motor.

20 Claims, 21 Drawing Sheets

(56) References Cited

OTHER PUBLICATIONS

International Search Report in PCT IL/2020/050834 dated Oct. 25, 2020.
International Preliminary Report on Patentability in PCT IL/2020/050834 dated Aug. 4, 2021.

* cited by examiner

SURFACE TRAVERSING ENGINE

FIELD OF THE INVENTION

The present invention generally pertains to a device for travelling over rough surfaces or through tunnels.

BACKGROUND OF THE INVENTION

There is a need in many areas for vehicles that can travel off-road, whether over rough terrain or through tunnels. For example, small unmanned vehicles can be used to follow persons or other moving things, where the person or other moving thing may cross open fields, climb over rocks, go through tunnels or pipes or climb up stairs. In the prior art, off-road vehicles have typically used wheels, continuous tracks, or vibrational motors to enable them to move across or through the terrain.

U.S. Pat. No. 6,431,079 discloses a vehicle for traversing a surface, for example for carrying out an inspection, survey or maintenance operation upon that surface, includes two or more bodies interconnected by structure for moving the bodies towards and away from each other, each of the bodies being supported upon a multiplicity of resilient bristles extending from it. By relative movement of the bodies, the vehicle is able to traverse the surface, which may be flat or curved, for example the internal or external surface of a tubular conduit such as a tunnel, shaft or pipe.

However the device of U.S. Pat. No. 6,431,079 comprises a pneumatic cylinder linking the bodies, movement by means of lengthening and shortening the pneumatic cylinder external to the one-piece sections.

U.S. Pat. No. 9,238,178 discloses an apparatus includes a housing, a rotational motor situated within the housing, a vibrating mechanism, and a plurality of appendages each having an appendage base proximal to the housing and an appendage tip distal from the housing. One or more of the appendages are adapted to cause the apparatus to move across a surface in a forward direction generally defined by a longitudinal offset between the appendage base and the appendage tip, and the appendages include two or more appendages disposed such that the appendage tips of the two or more appendages are adapted to contact opposing surfaces to produce a net force in a direction generally defined by a longitudinal offset between the appendage base and the appendage tip of the two or more appendages as the vibrating mechanism causes the apparatus to vibrate. The net force can allow the apparatus to climb when the opposing surfaces are inclined.

However, the apparatus in U.S. Pat. No. 9,238,178 is unitary, with all the legs attached to the same chassis and being moved by the same vibrator.

U.S. Pat. No. 8,294,333 discloses an autonomous vibration-driven device, for motion through a lumen or along a surface, utilizing an array of flexible fibers attached to the body of the device. The outer surface of the fibers have an anisotropic coefficient of friction with the surface along which the device is to move, and the fibers extend from the device body such that at least some of the fibers are in contact with the walls along a part of their length. A transducer is used to vibrate the device, such that it moves down the lumen. The transducer can be either device borne or external. A rotary device is also described, utilizing an array of fibers disposed on the rotor's body, the fibers having an anisotropic coefficient of friction with a central stator or with an outer circular wall. A planar motion device is also described for crawling over a planar surface.

However, the apparatus in U.S. Pat. No. 8,294,333 is unitary, with all the fibers attached to the same chassis and being moved by the same vibrator.

U.S. Pat. No. 3,946,459 discloses a self-propelled pipe cleaner with a body shaped to conform to the inside of a pipe with the axial extent of the body covered with a bristle pile material extending outward from the body to engage the inside of the pipe. The pile has resilient bristles uniformly inclined rearwardly relative to a forward direction of motion of the body. A vibrator is mounted within the body and energized for vibrating the body reciprocally and axially so the bristles engaging the inside of the pipe move the cleaner forward through the pipe for cleaning the pipe.

However, the pipe cleaner of U.S. Pat. No. 3,946,459 is unitary, with all the fibers attached to the same chassis and being moved by the same vibrator.

U.S. Pat. No. 3,196,580 discloses a vehicle which is supported by longitudinally depending resilient elements such as brush bristles or leaf springs, propulsive force being imparted to these resilient elements by a whirling weight carried in driving relationship on the vehicle. This whirling weight imparts a vibratory action on the vehicle, due to the rapid shift of the center of gravity, which vibrations are transferred into a propulsive force through the resilient depending elements.

To this end, the depending elements are rearwardly inclined in the opposite direction to vehicle movement.

However, the vehicle of U.S. Pat. No. 3,196,580 is unitary, with all the fibers attached to the same chassis and being moved by the same vibrator.

U.S. Pat. No. 2,917,762 discloses an apparatus for traveling through pipes, conduits and the like, comprising a pair of brushes which, for example, may be of circular cross sectional shape having a central core supporting the bristles. The bristles are designed for supporting the core in a position spaced away from the walls of the conduit or pipes through which the apparatus is to travel, the diameter of the brushes being normally preferably slightly in excess of the inside diameter of such passage. Furthermore, the bristles of the brushes are tilted generally backward with respect to the proposed direction of motion. Such brushes support therebetween a suitable vibratory power means whereby the core members are vibrated in directions substantially at right angles to the longitudinal axis of the apparatus.

However, the apparatus of U.S. Pat. No. 2,917,762 is unitary, with a fixed distance between sets of fibers, with the vibration perpendicular to the long axis of the device.

The article *A Bristle-Based Pipeline Robot for Ill-Constraint Pipes* by ZHELONG Wang and HONG Gu (IEEE/ASME Transactions on Mechatronics, vol. 13, no. 3, pp 383-392, June 2008) discloses the study of a pipeline robot based on a bristle mechanism. The bristle mechanism shows great flexibility and makes the pipeline robot to be able to work in ill-constraint pipes, which were previously considered as unpiggable or uninspectable. The working principle of the pipeline robot is illustrated and the bristle mechanism is given an in-depth analysis. A bristle traction force model is set up and an approximate calculation of bristle traction force based on Euler buckling theory is also described. The approximate calculation is conducted and simulated by using a single bristle. A laboratory experiment of bristle traction force is carried out and then the experimental result is compared with the calculation result. The experimental result shows the validity of the bristle traction force model. Field trials of brush pipeline robots were also conducted in ill-constraint pipes and the trial results show the flexibility and adaptability of the bristle mechanism. Future work and key issues in research on brush pipeline robots are discussed at the end of the paper.

However, the article by Zhelong and Wang discloses a robot comprising a pneumatic cylinder linking the bodies, movement by means of lengthening and shortening a pneumatic cylinder external to the one-piece sections.

It is therefore a long felt need to provide a non-unitary device, where the distance between sets of bristles is not fixed, motive power is not vibratory, and none of the sections is unpowered.

SUMMARY OF THE INVENTION

It is an object of the present invention to disclose a device for moving across a surface. The device comprises at least one section, the section having a main longitudinal axis, the section comprising a core and at least one drive sleeve, the at least one drive sleeve reversibly movable relative to the core in a direction of the main longitudinal axis; for each the at least one section, at least one row of core whiskers in mechanical communication with the core; for each the at least one section, at least one row of sleeve whiskers in mechanical communication with the drive sleeve. Each the at least one section comprises a rotor in mechanical connection with the core and the at least one drive sleeve, the rotor configured to reversibly move the drive sleeve relative to the core. For each the section, the rotor is inside a housing of the section.

It is another object of the present invention to disclose the device defined above, wherein each member of a group consisting of the at least one row of core whiskers and the at least one row of sleeve whiskers comprises at least one whisker at at least one position.

It is another object of the present invention to disclose the device as defined in any of the above, comprising a rod, the rod connected at a rod drive end with the rotor and the rod connected at a rod core end with the core.

It is another object of the present invention to disclose the device as defined in any of the above, wherein the rod is connected to a peripheral portion of the rotor.

It is another object of the present invention to disclose the device as defined in any of the above, wherein the rod comprises at least one arm, the rod being connected to the arm.

It is another object of the present invention to disclose the device as defined in any of the above, wherein the at least one section additionally comprises a rocking mechanism, the rocking mechanism configured to displace either the rotor or the rotor and the motor in a direction perpendicular to the main longitudinal axis of the at least one section.

It is another object of the present invention to disclose the device as defined in any of the above, it additionally comprising a device head and/or a controller. The controller is can be positioned within the device head.

It is another object of the present invention to disclose the device as defined in any of the above, additionally comprising a member of a group consisting of a processor, wired communications with the at least one section, wireless communications with the at least one section, wired communications with an external controller, wireless communications with an external controller, at least one sensor, and any combination thereof.

It is another object of the present invention to disclose the device as defined in any of the above, wherein the processor comprises software configured to perform a member of a group consisting of control at least one motor, control movement of at least one whisker, control speed of the device, control direction of at least one section, control bending of at least one section, acquire sensor data, control movement of at least one arm, control access to at least one storage location, analyze at least one camera image, store at least a part of at least one image, accept commands from an external controller, send data to an external controller, store commands, store data, and any combination thereof.

It is another object of the present invention to disclose the device as defined in any of the above, wherein the at least one sensor is selected from a group consisting of a camera, a temperature sensor, a pressure sensor, a distance sensor, a direction sensor, a velocity sensor, an accelerometer, a pressure sensor, a sound sensor, a force sensor, and any combination thereof.

It is another object of the present invention to disclose the device as defined in any of the above, additionally comprising at least one arm configured to grasp at least one object.

It is another object of the present invention to disclose the device as defined in any of the above, additionally comprising at least one location configured to store the at least one object at least temporarily.

It is another object of the present invention to disclose the device as defined in any of the above, wherein for each section, for each core whisker in the at least one row of core whiskers, a free end of the core whisker is closer to the core end of the section than a base end of the same core whisker and, for each sleeve whisker in the at least one row of sleeve whiskers, a free end of the sleeve whisker is closer to the core end of the section than a base end of the same sleeve whisker.

It is another object of the present invention to disclose the device as defined in any of the above, wherein for each section, for each core whisker in the at least one row of core whiskers, a free end of the core whisker is closer to the drive end of the section than a base end of the same core whisker and, for each sleeve whisker in the at least one row of sleeve whiskers, a free end of the sleeve whisker is closer to the drive end of the section than a base end of the same sleeve whisker.

It is another object of the present invention to disclose the device as defined in any of the above, wherein for the at least one section, an angle subtended between the main longitudinal axis of the at least one section and each whisker in a group consisting of the at least one row of core whiskers and the at least one row of sleeve whiskers is in a range between 45° and 90°.

It is another object of the present invention to disclose the device as defined in any of the above, additionally comprising at least one mechanism for reversing a direction of at least one member of a group consisting of the at least one row of core whiskers and the at least one row of sleeve whiskers It is another object of the present invention to disclose the device as defined in any of the above, wherein the at least one mechanism for reversing the direction is selected from a group consisting of a pivoting mechanism, a whisker end reversing mechanism, and any combination thereof.

It is another object of the present invention to disclose the device as defined in any of the above, wherein for the at least one section, for a row of whiskers selected from a group consisting of the at least one row of core whiskers and the at least one row of sleeve whiskers, the row of whiskers is within an area bounded by a length of the at least one section and an arc in a plane perpendicular to the main longitudinal axis of the at least one section.

It is another object of the present invention to disclose the device as defined in any of the above, wherein an angle subtended by the arc is in a range between 5° and 360°.

It is another object of the present invention to disclose the device as defined in any of the above, wherein the arc subtends an angle of 360°.

It is another object of the present invention to disclose the device as defined in any of the above, additionally comprising a steering mechanism.

It is another object of the present invention to disclose the device as defined in any of the above, wherein the core passes entirely through the section.

It is another object of the present invention to disclose a method for moving across a surface comprising steps as follows: (a) Providing a device for moving across a surface comprising: at least one section, the section having a main longitudinal axis, the section comprising a core and at least one drive sleeve, the at least one drive sleeve reversibly movable relative to the core in a direction of the main longitudinal axis; for each the at least one section, at least one row of core whiskers in mechanical communication with the core; for each the at least one section, at least one sleeve row of whiskers in mechanical communication with the drive sleeve. (b) Placing the device on a surface; and (c) Activating the device. Each the at least one section comprises a rotor in mechanical connection with the core and the at least one drive sleeve, the rotor configured to reversibly move the drive sleeve relative to the core. For each the section, the rotor is inside a housing of the section.

It is another object of the present invention to disclose the method as defined above, additionally comprising a step of providing each member of a group consisting of the at least one row of core whiskers and the at least one row of sleeve whiskers comprising at least one whisker at least one position.

It is another object of the present invention to disclose the method as defined in any of the above, additionally comprising steps of providing a rod, connecting the rod at a rod drive end with the rotor and connecting the rod at a rod core end with the core.

It is another object of the present invention to disclose the method as defined in any of the above, additionally comprising a step of connecting the rod to a peripheral portion of the rotor.

It is another object of the present invention to disclose the method as defined in any of the above, additionally comprising steps of providing the rod comprising at least one arm, and connecting the rod to the arm.

It is another object of the present invention to disclose the method as defined in any of the above, additionally comprising steps of providing the at least one section comprising a rocking mechanism, and the rocking mechanism displacing either the rotor or the rotor and the motor in a direction perpendicular to the main longitudinal axis of the at least one section.

It is another object of the present invention to disclose the method as defined in any of the above, additionally comprising a step of providing a device head.

It is another object of the present invention to disclose the method as defined in any of the above, additionally comprising a step of providing a controller.

It is another object of the present invention to disclose the method as defined in any of the above, additionally comprising a step of placing the controller within the device head.

It is another object of the present invention to disclose the method as defined in any of the above, additionally comprising a step of providing a member of a group consisting of a processor, wired communications with the at least one section, wireless communications with the at least one section, wired communications with an external controller, wireless communications with an external controller, at least one sensor, and any combination thereof.

It is another object of the present invention to disclose the method as defined in any of the above, additionally comprising a step of providing the processor comprising software configured to perform a member of a group consisting of control at least one motor, control movement of at least one whisker, control speed of the device, control direction of at least one section, control bending of at least one section, acquire sensor data, control movement of at least one arm, control access to at least one storage location, analyze at least one camera image, store at least a part of at least one image, accept commands from an external controller, send data to an external controller, store commands, store data, and any combination thereof.

It is another object of the present invention to disclose the method as defined in any of the above, additionally comprising a step of selecting the at least one sensor from a group consisting of a camera, a temperature sensor, a pressure sensor, a distance sensor, a direction sensor, a velocity sensor, an accelerometer, a pressure sensor, a sound sensor, a force sensor, and any combination thereof.

It is another object of the present invention to disclose the method as defined in any of the above, additionally comprising a step of providing at least one arm.

It is another object of the present invention to disclose the method as defined in any of the above, additionally comprising a step of grasping at least one object with the at least one arm.

It is another object of the present invention to disclose the method as defined in any of the above, additionally comprising a step of providing at least one storage location.

It is another object of the present invention to disclose the method as defined in any of the above, additionally comprising a step of storing the at least one object at least temporarily in the at least one storage location.

It is another object of the present invention to disclose the method as defined in any of the above, wherein for each section, for each core whisker in the at least one row of core whiskers, positioning a free end of the core whisker closer to the core end of the section than a base end of the same core whisker and, for each sleeve whisker in the at least one row of sleeve whiskers, positioning a free end of the sleeve whisker closer to the core end of the section than a base end of the same sleeve whisker.

It is another object of the present invention to disclose the method as defined in any of the above, wherein for each section, for each core whisker in the at least one row of core whiskers, positioning a free end of the core whisker closer to the drive end of the section than a base end of the same core whisker and, for each sleeve whisker in the at least one row of sleeve whiskers, positioning a free end of the sleeve whisker closer to the drive end of the section than a base end of the same sleeve whisker.

It is another object of the present invention to disclose the method as defined in any of the above, additionally comprising a step of, for the at least one section, selecting an angle subtended between the main longitudinal axis of the at least one section and each whisker in a group consisting of the at least one row of core whiskers and the at least one row of sleeve whiskers is in a range between 45° and 90°.

It is another object of the present invention to disclose the method as defined in any of the above, additionally comprising a step of providing at least one mechanism for reversing a direction of at least one member of a group consisting of the at least one row of core whiskers and the at least one row of sleeve whiskers It is another object of the present invention to disclose the method as defined in any of the above, additionally comprising a step of selecting the at least one mechanism for reversing the direction from a group consisting of a pivoting mechanism, a whisker end reversing mechanism, and any combination thereof.

It is another object of the present invention to disclose the method as defined in any of the above, additionally comprising a step of, for the at least one section, for a row of whiskers selected from a group consisting of the at least one row of core whiskers and the at least one row of sleeve whiskers, positioning the row of whiskers within an area bounded by a length of the at least one section and an arc in a plane perpendicular to the main longitudinal axis of the at least one section.

It is another object of the present invention to disclose the method as defined in any of the above, additionally comprising a step of selecting an angle subtended by the arc to be in a range between 5° and 360°.

It is another object of the present invention to disclose the method as defined in any of the above, additionally comprising a step of the arc subtending an angle of 360°.

It is another object of the present invention to disclose the method as defined in any of the above, additionally comprising a step of providing a steering mechanism.

It is another object of the present invention to disclose the device as defined in any of the above, wherein the core passes entirely through the section.

It is an object of the present invention to disclose a device for moving across a surface. The device comprises at least one section, the section having a main longitudinal axis, the section comprising a core and at least one drive sleeve, the at least one drive sleeve reversibly movable relative to the core in a direction of the main longitudinal axis; for each the at least one section, at least one row of core whiskers in mechanical communication with the core; for each the at least one section, at least one row of sleeve whiskers in mechanical communication with the drive sleeve. Each the at least one section comprises a rotor in mechanical connection with the core and the at least one drive sleeve, the rotor configured to reversibly move the drive sleeve relative to the core. For each the section, the rotor is inside a housing of the section.

It is another object of the present invention to disclose the device defined above, wherein each member of a group consisting of the at least one row of core whiskers and the at least one row of sleeve whiskers comprises at least one whisker at at least one position.

It is another object of the present invention to disclose the device as defined in any of the above, comprising a rod, the rod connected at a rod drive end with the rotor and the rod connected at a rod core end with the core.

It is another object of the present invention to disclose the device as defined in any of the above, wherein the rod is connected to a peripheral portion of the rotor.

It is another object of the present invention to disclose the device as defined in any of the above, wherein the rod comprises at least one arm, the rod being connected to the arm.

It is another object of the present invention to disclose the device as defined in any of the above, wherein the at least one section additionally comprises a rocking mechanism, the rocking mechanism configured to displace either the rotor or the rotor and the motor in a direction perpendicular to the main longitudinal axis of the at least one section.

It is another object of the present invention to disclose the device as defined in any of the above, it additionally comprising a device head and/or a controller. The controller is can be positioned within the device head.

It is another object of the present invention to disclose the device as defined in any of the above, additionally comprising a member of a group consisting of a processor, wired communications with the at least one section, wireless communications with the at least one section, wired communications with an external controller, wireless communications with an external controller, at least one sensor, and any combination thereof.

It is another object of the present invention to disclose the device as defined in any of the above, wherein the processor comprises software configured to perform a member of a group consisting of control at least one motor, control movement of at least one whisker, control speed of the device, control direction of at least one section, control bending of at least one section, acquire sensor data, control movement of at least one arm, control access to at least one storage location, analyze at least one camera image, store at least a part of at least one image, accept commands from an external controller, send data to an external controller, store commands, store data, and any combination thereof.

It is another object of the present invention to disclose the device as defined in any of the above, wherein the at least one sensor is selected from a group consisting of a camera, a temperature sensor, a pressure sensor, a distance sensor, a direction sensor, a velocity sensor, an accelerometer, a pressure sensor, a sound sensor, a force sensor, and any combination thereof.

It is another object of the present invention to disclose the device as defined in any of the above, additionally comprising at least one arm configured to grasp at least one object.

It is another object of the present invention to disclose the device as defined in any of the above, additionally comprising at least one location configured to store the at least one object at least temporarily.

It is another object of the present invention to disclose the device as defined in any of the above, wherein for each section, for each core whisker in the at least one row of core whiskers, a free end of the core whisker is closer to the core end of the section than a base end of the same core whisker and, for each sleeve whisker in the at least one row of sleeve whiskers, a free end of the sleeve whisker is closer to the core end of the section than a base end of the same sleeve whisker.

It is another object of the present invention to disclose the device as defined in any of the above, wherein for each section, for each core whisker in the at least one row of core whiskers, a free end of the core whisker is closer to the drive end of the section than a base end of the same core whisker and, for each sleeve whisker in the at least one row of sleeve whiskers, a free end of the sleeve whisker is closer to the drive end of the section than a base end of the same sleeve whisker.

It is another object of the present invention to disclose the device as defined in any of the above, wherein for the at least one section, an angle subtended between the main longitudinal axis of the at least one section and each whisker in a group consisting of the at least one row of core whiskers and the at least one row of sleeve whiskers is in a range between 45° and 90°.

It is another object of the present invention to disclose the device as defined in any of the above, additionally comprising at least one mechanism for reversing a direction of at least one member of a group consisting of the at least one row of core whiskers and the at least one row of sleeve whiskers It is another object of the present invention to disclose the device as defined in any of the above, wherein the at least one mechanism for reversing the direction is selected from a group consisting of a pivoting mechanism, a whisker end reversing mechanism, and any combination thereof.

It is another object of the present invention to disclose the device as defined in any of the above, wherein for the at least one section, for a row of whiskers selected from a group consisting of the at least one row of core whiskers and the at least one row of sleeve whiskers, the row of whiskers is within an area bounded by a length of the at least one section and an arc in a plane perpendicular to the main longitudinal axis of the at least one section.

It is another object of the present invention to disclose the device as defined in any of the above, wherein an angle subtended by the arc is in a range between 5° and 360°.

It is another object of the present invention to disclose the device as defined in any of the above, wherein the arc subtends an angle of 360°.

It is another object of the present invention to disclose the device as defined in any of the above, additionally comprising a steering mechanism.

It is another object of the present invention to disclose a method for moving across a surface comprising steps as follows: (a) Providing a device for moving across a surface comprising: at least one section, the section having a main longitudinal axis, the section comprising a core and at least one drive sleeve, the at least one drive sleeve reversibly movable relative to the core in a direction of the main longitudinal axis; for each the at least one section, at least one row of core whiskers in mechanical communication with the core; for each the at least one section, at least one sleeve row of whiskers in mechanical communication with the drive sleeve. (b) Placing the device on a surface; and (c) Activating the device. Each the at least one section comprises a rotor in mechanical connection with the core and the at least one drive sleeve, the rotor configured to reversibly move the drive sleeve relative to the core. For each the section, the rotor is inside a housing of the section.

It is another object of the present invention to disclose the method as defined above, additionally comprising a step of providing each member of a group consisting of the at least one row of core whiskers and the at least one row of sleeve whiskers comprising at least one whisker at least one position.

It is another object of the present invention to disclose the method as defined in any of the above, additionally comprising steps of providing a rod, connecting the rod at a rod drive end with the rotor and connecting the rod at a rod core end with the core.

It is another object of the present invention to disclose the method as defined in any of the above, additionally comprising a step of connecting the rod to a peripheral portion of the rotor.

It is another object of the present invention to disclose the method as defined in any of the above, additionally comprising steps of providing the rod comprising at least one arm, and connecting the rod to the arm.

It is another object of the present invention to disclose the method as defined in any of the above, additionally comprising steps of providing the at least one section comprising a rocking mechanism, and the rocking mechanism displacing either the rotor or the rotor and the motor in a direction perpendicular to the main longitudinal axis of the at least one section.

It is another object of the present invention to disclose the method as defined in any of the above, additionally comprising a step of providing a device head.

It is another object of the present invention to disclose the method as defined in any of the above, additionally comprising a step of providing a controller.

It is another object of the present invention to disclose the method as defined in any of the above, additionally comprising a step of placing the controller within the device head.

It is another object of the present invention to disclose the method as defined in any of the above, additionally comprising a step of providing a member of a group consisting of a processor, wired communications with the at least one section, wireless communications with the at least one section, wired communications with an external controller, wireless communications with an external controller, at least one sensor, and any combination thereof.

It is another object of the present invention to disclose the method as defined in any of the above, additionally comprising a step of providing the processor comprising software configured to perform a member of a group consisting of control at least one motor, control movement of at least one whisker, control speed of the device, control direction of at least one section, control bending of at least one section, acquire sensor data, control movement of at least one arm, control access to at least one storage location, analyze at least one camera image, store at least a part of at least one image, accept commands from an external controller, send data to an external controller, store commands, store data, and any combination thereof.

It is another object of the present invention to disclose the method as defined in any of the above, additionally comprising a step of selecting the at least one sensor from a group consisting of a camera, a temperature sensor, a pressure sensor, a distance sensor, a direction sensor, a velocity sensor, an accelerometer, a pressure sensor, a sound sensor, a force sensor, and any combination thereof.

It is another object of the present invention to disclose the method as defined in any of the above, additionally comprising a step of providing at least one arm.

It is another object of the present invention to disclose the method as defined in any of the above, additionally comprising a step of grasping at least one object with the at least one arm.

It is another object of the present invention to disclose the method as defined in any of the above, additionally comprising a step of providing at least one storage location.

It is another object of the present invention to disclose the method as defined in any of the above, additionally comprising a step of storing the at least one object at least temporarily in the at least one storage location.

It is another object of the present invention to disclose the method as defined in any of the above, wherein for each section, for each core whisker in the at least one row of core whiskers, positioning a free end of the core whisker closer to the core end of the section than a base end of the same core whisker and, for each sleeve whisker in the at least one row of sleeve whiskers, positioning a free end of the sleeve whisker closer to the core end of the section than a base end of the same sleeve whisker.

It is another object of the present invention to disclose the method as defined in any of the above, wherein for each section, for each core whisker in the at least one row of core whiskers, positioning a free end of the core whisker closer to the drive end of the section than a base end of the same core whisker and, for each sleeve whisker in the at least one row of sleeve whiskers, positioning a free end of the sleeve whisker closer to the drive end of the section than a base end of the same sleeve whisker.

It is another object of the present invention to disclose the method as defined in any of the above, additionally comprising a step of, for the at least one section, selecting an angle subtended between the main longitudinal axis of the at least one section and each whisker in a group consisting of the at least one row of core whiskers and the at least one row of sleeve whiskers is in a range between 45° and 90°.

It is another object of the present invention to disclose the method as defined in any of the above, additionally comprising a step of providing at least one mechanism for reversing a direction of at least one member of a group consisting of the at least one row of core whiskers and the at least one row of sleeve whiskers It is another object of the present invention to disclose the method as defined in any of the above, additionally comprising a step of selecting the at least one mechanism for reversing the direction from a group consisting of a pivoting mechanism, a whisker end reversing mechanism, and any combination thereof.

It is another object of the present invention to disclose the method as defined in any of the above, additionally comprising a step of, for the at least one section, for a row of whiskers selected from a group consisting of the at least one row of core whiskers and the at least one row of sleeve whiskers, positioning the row of whiskers within an area bounded by a length of the at least one section and an arc in a plane perpendicular to the main longitudinal axis of the at least one section.

It is another object of the present invention to disclose the method as defined in any of the above, additionally comprising a step of selecting an angle subtended by the arc to be in a range between 5° and 360°.

It is another object of the present invention to disclose the method as defined in any of the above, additionally comprising a step of the arc subtending an angle of 360°.

It is another object of the present invention to disclose the method as defined in any of the above, additionally comprising a step of providing a steering mechanism.

BRIEF DESCRIPTION OF THE FIGURES

In order to better understand the invention and its implementation in practice, a plurality of embodiments will now be described, by way of non-limiting example only, with reference to the accompanying drawings, wherein FIG. 1 schematically illustrates a cross-section of an embodiment of the device of the present invention;

FIGS. 9A-D, 10, 11A-D and 12A-C schematically illustrate reversal of the direction of travel by means of exchanging base and distal ends of a whisker.

DETAILED DESCRIPTION OF THE PREFERRED EMBODIMENTS

Figure 1:
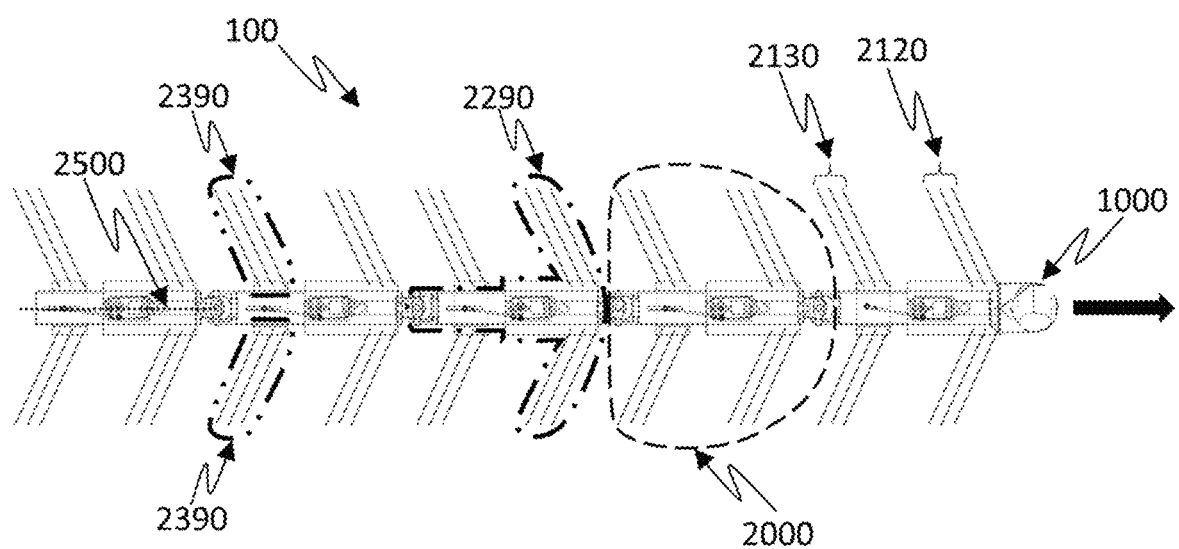

The following description is provided, alongside all chapters of the present invention, so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide a device for travelling over rough surfaces or through tunnels.

In the Figures, similar numbers refer to similar parts.

The present invention is a system, which can be robotic or manually controlled, designed for irregular spaces with variable geometry and is designed to operate in areas where conventional mechanisms have difficulty moving. The system is most advantageous in closed tubular spaces characterized by limited access that in the prior art, required human control or human access, often at the risk of an operator's life.

The system can be fully autonomous, partially autonomous, or fully manually controlled. If partially autonomous or fully manually controlled, it can be remotely controlled or locally controlled. In some embodiments, control is via a human carried by the system, typically in its head.

In the prior art, robots designed for use in enclosed spaces are typically wheel-based or caterpillar-based and do not function well in complex media with a dense environment, significant geometrical changes and multiple obstacles.

Typical prior art robots include:

All terrain robots—developed for work on the ground. They have high capability in this environment, but are not well adapted for passage through narrow apertures.

Robots for infrastructure—developed for work in pipes, mainly for the maintenance of infrastructure. They are typically designed for use in standard sections (pipes, channels, etc.) and are not well adapted for use in irregular or changing sections.

Special robots—robots with unique propulsion mechanisms such as robots that mimic snakes, hopping robots, and robots using a screw mechanism. Snakes and hopping robots need room to move; the snakes laterally and the hopping robots vertically, while screw mechanism robots require a well-defined section in order to move efficiently.

Stealth/motorized balloons—motorized skis and balloons flown into tunnels and caves. Again, significant space is needed to get the devices to their destination.

These platforms do not provide an adequate solution because their propulsion capabilities do not allow sufficient movement in this medium. In addition, alternatives were also examined for the use of underground drones, but these are very limited in carrying capacity, are sensitive to communication problems, unable to operate in liquid, delicate and have difficulty dealing with obstacles that are not on the ground (such as cables hanging from the ceiling).

The article *A Bristle-Based Pipeline Robot for Ill-Constraint Pipes* by ZHELONG Wang and HONG Gu (IEEE/

ASME Transactions on Mechatronics, vol. 13, no. 3, pp 383-392, June 2008) (hereinafter Zhelong and Hong) is distinguished from the present invention by, inter alia, the following drawback: As the bristle rotates about its proximal end and the bristle angle moves beyond a critical angle θ with respect to the pipe wall, the axial force that the bristle can sustain decreases to zero. Thus, the bristle flips through, pushing the brush core back along the pipe. The failure of the bristle by buckling is an instability phenomenon, hence the flip through of the bristle is a quick and unstable process.

In the device of the present invention, the movement mechanism maximizes the properties needed for movement in confined spaces. One is to take advantage of the entire area of contact with the enclosed space envelope. Another is indifference to the complexity of the movement medium, which enables coping with changes in the geometry of the movement medium, including changes in diameter and overcoming unexpected obstacles. A third is the device is flexible so that is can move in tortuous spaces.

The device is suitable for use in a variety of areas, such as:
- Locating, rescuing and rescuing—in areas of natural disasters, destruction sites, compounds that are not accessible to rescuers due to dangerous atmosphere (toxic/explosive/radioactive/danger of collapse), mines, tunnels and natural caves.
- Infrastructure maintenance, accessibility mapping and access—water, electricity, gas, fuel, air conditioning, etc., including threading cables through old or crowded conduits.
- Research—a tool for conducting research in natural or artificial tunnels that are not accessible to humans, for example, mapping and collecting underground and underwater samples in inaccessible areas.
- Cleaning—ventilation ducts in commercial buildings (such as restaurants) are typically long and relatively narrow, as well as interconnected, making conventional cleaning difficult at best.

The device is configured to do at least one of the following: move across smooth ground, move across rough ground, move past protuberances in a surface, move past depressions in a surface, move through tunnels, move through pipes, move through ditches and any combination thereof. Pipes and tunnels can have any cross-section, including circular, oval, elliptical, polygonal and any combination thereof, as long as the smallest dimension of the pipe or tunnel is larger than the central portion(s) of the section(s).

The present invention comprises at least one section, each section having a portion comprising a drive sleeve and a core, the drive sleeve and core reciprocally movable toward each other. The drive sleeve has at least one set of whiskers and the core has at least one set of whiskers, the whiskers extending outwards and generally rearwards. The core can pass entirely through the section, with the core extending past the drive sleeve at both ends, or the core can extend only partway through the drive sleeve, with the core and drive sleeve overlapping, the core being one end of the section and the drive sleeve being the opposite end of the section, The whiskers are configured to (a) support the weight of the central portion so that the central portion does not contact the surroundings of the device, except in exceptional circumstances (e.g., a very narrow tunnel), and (b) enable movement of the section, as disclosed hereinbelow.

The cross-section of a whisker can be circular, elliptical, oval, polygonal, and any combination thereof. A polygon can have between 3 and 20 sides. A polygon can be regular or irregular. For non-limiting example, a 4-sided polygon can be a square, a rectangle, a parallelogram, a diamond, a kite, and any combination thereof.

For each section, the whiskers point outwardly within an area bounded by the length of the section and an arc in a plane substantially perpendicular to the main longitudinal axis of the section and subtending a range between 5° and 360°. Preferably, the arc subtends 360°; the whiskers point outwardly from the section in all directions.

Reciprocal motion is effected by a motor at one end of a section, the motor being in communication with the other end of the section. In preferred embodiments, the motor is in communication with one end of a rod, the other end of the rod being jointedly attached to the other end of the section. In other embodiments, other conventional methods of generating reciprocal motion of one end of the section relative to the other end can be used, for non-limiting example, a pneumatic cylinder internal to the section, a stepper motor and any combination thereof.

For simplicity, the end of the section comprising the motor will be referred to hereinafter as the drive end and the opposite end, to which the rod is rotatably attached, will be referred to hereinafter as the core end. Similarly, the end of the rod in communication with the motor is the rod drive end and the end of the rod jointedly attached to the core is the rod core end.

The rod drive end is connected to the motor by means of a rotator, with the axis of rotation of the rotator being perpendicular to the main longitudinal axis of the section, the main longitudinal axis of the section also being the primary direction of motion of the section. The motor is in communication with a rotator operatively connected to the drive sleeve; as the rotator is being rotated by the motor, the rod drive end is moved around the circumference of a circle whose center is the axis of rotation of the rotator. Therefore, when the rod drive end is nearest the front of the section, the distance between the front of the drive sleeve and the rear of the core is smallest and when the rod drive end is nearest the back of the section (closest to the core), the distance between the front of the drive sleeve and the rear of the core is smallest.

In some embodiments, the motor is in the core; in other embodiments, the motor is in the drive sleeve.

In some embodiments, at least one section comprises a single drive sleeve. In some embodiments, at least one section comprises a plurality of drive sleeves, all of the drive sleeves being driven by the same motor. In some embodiments with a plurality of drive sleeves, at least two of the drive sleeves are driven by different motors.

If there is more than one section, each section is linearly connected to a next section by at least one joint, thereby allowing the sections to bend relative to each other around at least one axis. The joint can be a hinge, a universal joint, a straight joint, and any combination thereof. Preferably, the two sections can bend relative to each other around at least two mutually perpendicular axes.

In some embodiments, at least two sections comprise independent batteries or other power sources. In some embodiments, all sections are connected to the same power source, which can be in the head or in one section. In embodiments where more than one section comprise the same power source, the sections sharing a power source are in electrical communication.

Preferably, at least one section comprises a steering mechanism. In one embodiment, steering is by bending at least one joint between two sections by means of a steering cable controlled by a servo motor. The servo motor is controlled by a processor (disclosed hereinbelow) and can be in the head of the device (see hereinbelow) or in the section. In some embodiments, each joint undergoes the same amount of bending. In some embodiments, at least two sections can be bend by difference amounts.

Starting from a position where the front of the drive sleeve and the rear of the core are closest together, with the whiskers pointing generally backward, away from the drive end, as the drive sleeve and the core are moved apart by the motor/rotor, friction between the rear row(s) of whiskers and the ground (and/or the walls of a pipe or tunnel) will be greater than friction between the drive end row(s) of whiskers and the ground (and/or walls) since the core end row(s) of whiskers are being forced into the ground (and/or walls) while the drive end row(s) of whiskers can slide along the ground (and/or walls). Therefore, during the period when the drive sleeve and the core move apart, the core will remain substantially stationary while the drive sleeve moves forward.

After the drive sleeve and the core are furthest apart, they will be moved closer together by the motor/rotor. When the drive sleeve and the core move towards each other, the drive sleeve will be pulled backwards and the core will be pulled forwards relative to the surface(s) so that friction between the drive end row(s) of whiskers and the ground (and/or the walls) will be greater than friction between the core end row(s) of whiskers and the ground (and/or walls) since the drive end row(s) of whiskers are being forced into the ground (and/or walls) while the core end row(s) of whiskers can slide along the ground (and/or walls). Therefore, the drive sleeve will remain substantially stationary while the core moves forward.

If the device whiskers are pointing generally forward, towards the drive end of the section(s), then the device will move in the reverse direction in the manner disclosed above, with the actions of the drive end and core end whiskers reversed.

For simplicity and clarity, unless otherwise stated, the whiskers will be presumed to be generally pointing away from the drive end so that the direction of motion of the device will be presumed to be generally towards the drive end.

FIG. 1 schematically illustrates a cross-section of an embodiment of the device (100) of the present invention. In the embodiment shown, the device comprises five sections (2000), with a controller (1000) at the head end of the device (100). Each section (2000) comprises a core portion (2290) and a drive sleeve portion (2390), with at least one row of whiskers (2120) in the core portion (2290) and at least one row of whiskers (2130) in the drive sleeve portion (2390). A head (1000), which can comprise a controller, a sensor, a processor, communications, and any combination thereof can be attached to at least one of the terminal sections (2000).

Figure 2:
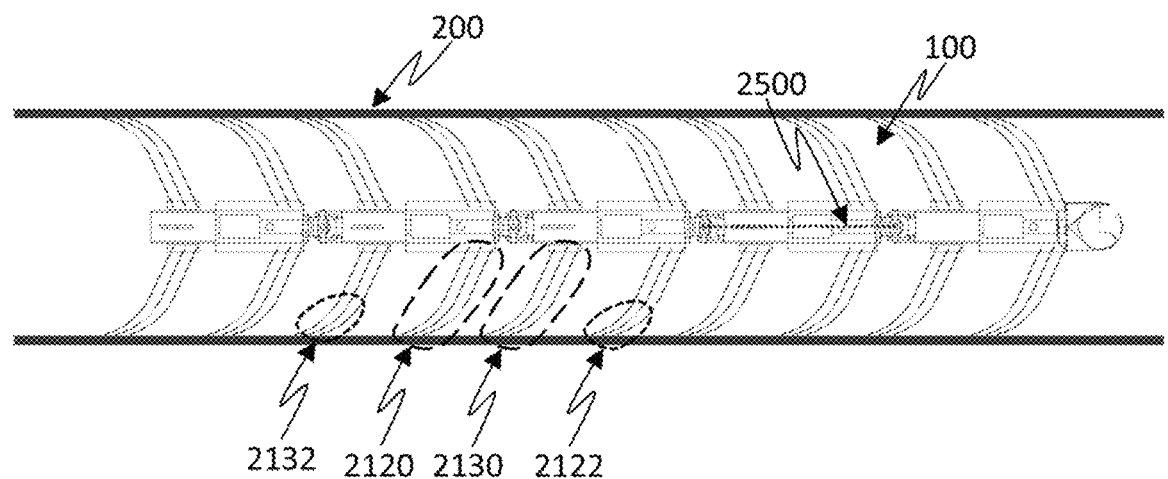
FIG. 2 schematically illustrates a cross-section of an embodiment of the device (100) in a pipe.

FIG. 2 schematically illustrates of a cross-section of an embodiment of the device (100) in a pipe (200). In FIG. 2, the device (100) is moving towards the right of the figure. The general orientation of the whiskers (2120, 2130) is rearward, in the opposite direction from the direction of travel and the distal (free) end portions (2122, 2132) of the whiskers (2120, 2130) are bent backward; the diameter of the pipe (200) being smaller than the diameter of the device when the whiskers are straight. Although the device can travel through a pipe of diameter larger than the diameter of the device with unbent whiskers, whiskers are not in contact with the pipe can not contribute to the motion of the device so that it can move more efficiently through a pipe of diameter smaller than the diameter of the device when the whiskers are straight.

In some embodiments, the device comprises at least one arm configured to grasp at least one object external to the device. In variants of such embodiments, the device further comprises at least one location configured to store at least one object at least temporarily.

The controller can comprise a processor, wired or wireless communications with the section(s), wired or wireless communications with an external controller, at least one sensor, and any combination thereof. The sensor can comprise a camera for capturing images of the surroundings, a temperature sensor, a pressure sensor, a distance sensor, a direction sensor, a velocity sensor, an accelerometer, a pressure sensor, a sound sensor, a force sensor, a magnetic sensor, an acoustic sensor, a seismic sensor, a laser scanner, an RF reader, an RF chip, a $CO_2$ detector, an IR sensor, a gas detector, an X-ray source and X-ray detector, a Geiger counter and any combination thereof.

The processor can comprise software configured to: control at least one motor, control movement of at least one whisker, control speed of the device, control direction of at least one section, control bending of at least one section, acquire sensor data, control movement of at least one arm, control access to at least one storage location, analyze at least one camera image, store at least a part of at least one image, accept commands from an external controller, send data to an external controller, store commands, store data, and any combination thereof.

Sensor data can comprise: a camera image, temperature data, distance data, direction data, pressure data, sound, force data, and any combination thereof. Temperature data can include ambient temperature, motor temperature, temperature of at least a portion of a drive sleeve, temperature of at least a portion of a core, temperature of at least a portion of a joint, temperature of at least a portion of a rod, temperature of at least a portion of a rotor, temperature of at least a portion of a whisker, temperature of at least a portion of a head and any combination thereof. Pressure data can include motor pressure, pressure on at least a portion of a drive sleeve, pressure on at least a portion of a core, pressure on at least a portion of a joint, pressure on at least a portion of a rod, pressure on at least a portion of a rotor, pressure on at least a portion of a whisker, pressure on at least a portion of a head and any combination thereof. Force data can include force exerted by a motor force, force exerted on at least a portion of a drive sleeve, force exerted on at least a portion of a core, force exerted on at least a portion of a joint, force exerted on at least a portion of a rod, force exerted on at least a portion of a rotor, force exerted on at least a portion of a whisker, force exerted on at least a portion of a head and any combination thereof.

Analysis of a camera image can include: determining a distance, determining a direction, identifying an item, identifying a destination, and any combination thereof. An item is a thing of interest, for non-limiting example, a bomb, a weapon, a door, an entrance to a pipe or tunnel, an exit from a pipe or tunnel, an obstacle, a human, an animal, a plant, furniture, or a wall.

Figure 3:
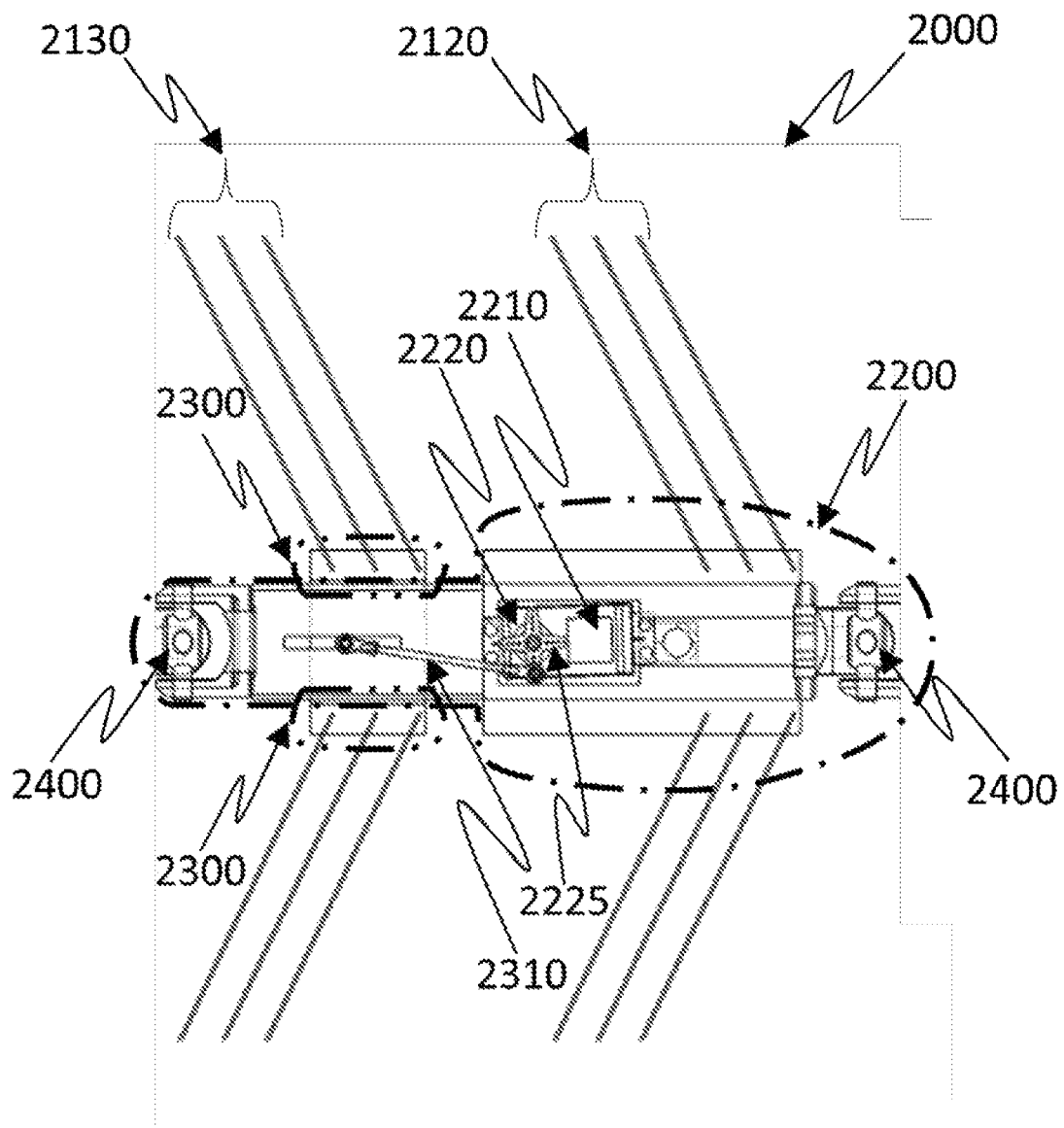
FIG. 3 schematically illustrates a cross-section of an embodiment of a section.

FIG. 3 schematically illustrates a cross-section of an embodiment of a section (2000). Each section (2000) comprises a core (2200, dot-double dashed ovals) and a drive sleeve (2300, dot-dash oval). The drive sleeve (2300) wraps around the core (2200) and can substantially frictionlessly and reversibly slide along the core (2300). Sections (2000) are connected together by joints (2400). In the embodiment shown, the joints are universal joints; in other embodiments, a joint can comprise any combination of the following: a hinge, a universal joint, a ball joint, a pivot joint, a hinge joint, a ball and socket joint, a condyloid joint, a saddle joint, a gliding joint, a knuckle joint or any other conventional joint.

In some embodiments (as shown), the core (2200) passes entirely through the section (2000) with the joint(s) at the drive end of the section (2000) and the joint(s) at the core end of the section (2000) being attached to the core (2200). In other embodiments, the drive sleeve (2300) extends only partway through the section (2000) so that the drive end joint(s) are attached to the drive sleeve (2300) while the core end joint(s) are attached to the core (2200).

A connection between the core (2200) and the drive sleeve (2300) allows reversible low-friction movement towards and away from each other between the drive sleeve (2300) and the core (2200). The connection between the drive sleeve (2300) and the core (2200) can be any conventional connection allowing such low-friction reversible movement, including a slidable connection, a jointed connection, a rolling connection and a bellows-type connection. Typically, a rolling connection will be by means of one or more bearings disposed between the drive sleeve (2300) and the core (2200).

In preferred embodiments entry of dirt or moisture into or onto the sections (2000) is prevented by means of an impermeable housing enclosing the section. In preferred embodiments, the joints (2400) are provided with a protective, preferably impermeable, housing; this housing can be a part of the section (2000) housing, or can be a separate unit Impermeable housings are well-known in the art.

In some embodiments, movement of the drive sleeve (2300) relative to the core (2200) is effectuated by means of a rod (2310) operatively attached to a rotor (2220). In these embodiments, the rotor (2220) and the motor (2210) which drives it are in the core end of the section (2000), with the rotor (2220) operatively attached to the core (2200). In this embodiment, the rotor (2220) has at least one arm (2225), with the rod (2310) core end attached to an arm (2225) of the rotor (2220), while the rod (2310) drive end is attached to the drive sleeve (2300). In the embodiment shown, the rotor (2210) has 4 arms (2225); a rotor (2220) can have between 0 and 10 arms (2225). In rotors (2220) with no arms (2225), the rod (2310) core end is attached to a peripheral portion of the rotor (2220).

In some embodiments, the means of reciprocal motion can be a rotor (2220) and rod (2310) (as shown, a hydraulic cylinder, an air-driven piston, a cam, or any other means known in the art for causing sliding relative motion between two parts of a device.

In embodiments where a motor (2210) is in a section, the motor (2210) is also within the section housing and in embodiments where a motor (2210) is in the head (1000) or in a tail portion (not shown), it is within a protective housing. Therefore, in all embodiments, all components of the means of reversibly and reciprocally moving the core (2200) and drive sleeve (2300) relative to each other are protected from damaging agents in the environment.

It should be noted that having the means of reversibly and reciprocally moving the drive sleeve (2300) and core (2200) relative to each other being components of a section (2000) differs significantly from what is known in the art, where the reciprocal motion is between adjacent sections, with the means of reciprocal motion linking the sections. Furthermore, having the rotor (2220), rod (2310) and motor (2210) being inside the section (2000) housing, thereby protecting them from contaminants and damage in the environment, is also not anticipated in the art.

As the rotor (2220) is rotated by the motor (2210), the drive sleeve (2300) is moved forward and backward relative to the core (2200).

It should be noted that, in some embodiments, the motor (2210) is in the core (2200) and in some embodiments, the motor (2210) is in the drive sleeve (2300).

In the exemplary embodiment of FIG. 3 each section (2000) comprises two sets of three rows of whiskers (2120, 2130), one set (2120) on the core (2200) and one set (2130) on the drive sleeve (2300). The whiskers (2120, 2130) extend outward from the sections (2000), generally parallel to each other, with one end attached to the section (2000) and one free end. The free end is generally rearward of the end ("base end") attached to the section (2000), where "rearward" is in the opposite direction from the direction of travel. In the exemplary embodiment of FIG. 2, the free end of the whiskers is toward the tail of the device; the direction of travel is toward the head of the device (black arrow in FIG. 1).

In preferred embodiments, the angle between the main longitudinal axis (2500) of a section (2000) and the whiskers (2120, 2130) attached to the section (2000) will be between 45° and 90°.

In preferred embodiments, the angle will be substantially the same)(±10° for all the whiskers (2120, 2130) attached to a section (2000). In some embodiments, the angle will be substantially the same (±10°) for all the core (2120) attached to the core (2200) and substantially the same (±10°) for all the drive sleeve whiskers (2130) attached to the drive sleeve (2300), but substantially different (>10°) between the core whiskers (2120) and the drive sleeve whiskers (2130). In some embodiments, at least two whiskers (2120, 2130) in a section (2000) can be at substantially different angles.

In preferred embodiments, the angle will be substantially the same (±10°) between the whiskers (2120, 2130) attached to one section (2000) and the whiskers (2120, 2130) attached to any other section (2000). In some embodiments, the whiskers (2120, 2130) can be at substantially different angles (>10°) between at least one section (2000) and at least one other section (2000).

The whiskers (2120, 2130) support the sections (2000), keeping the sections (2000) away from the ground or walls, enable motion of the device, as disclosed herein, and control the direction of motion of the device (100), as disclosed hereinbelow.

The whiskers can be flexible or rigid. Flexible whiskers can be of any material sufficiently stiff to support the sections (2000), and sufficiently flexible to bend, at least in a distal portion thereof, preferably near the free end (see FIG. 2, above, and FIG. 6, below). Typically, a flexible whisker is mounted to a section, either directly or via a holder, at one or more fixed angles to the section. If a flexible whisker in contact with a surface encounters an irregularity in the surface, it will flex so as to maintain contact with the surface.

A rigid whisker, on the other hand, which can not flex to maintain contact with a surface. However, the attachment system connecting the rigid whisker to the section can comprise a hinge or other rotatable support and one or more springs, thereby allowing the whisker to respond to irregularities in the surface and to maintain contact with the surface in spite of the irregularities.

The device can comprise whiskers that are flexible, whiskers that are rigid and any combination thereof.

In the exemplary embodiments of FIGS. 2 and 6, the whiskers are shown as flexible.

FIG. 4A-D schematically illustrates an embodiment of an attachment system for a rigid whisker (2100). In this illustrative embodiment, the frontmost row of whiskers, at the head (1000) end, are attached to the core (2200), while the remaining rows of whiskers are attached to drive sleeves (2300).

Figure 4A:
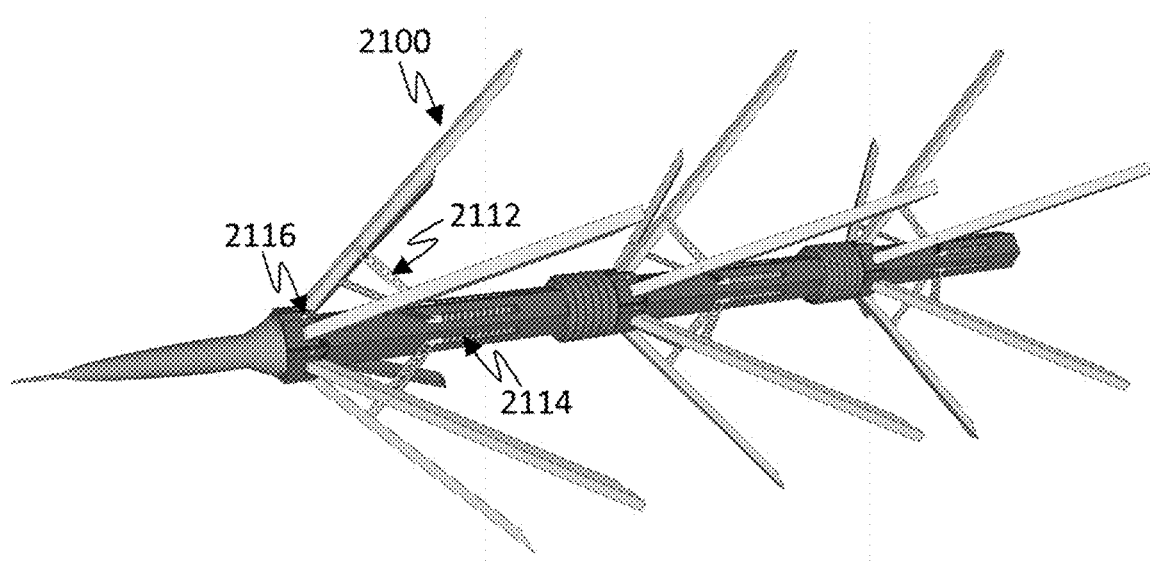
FIG. 4A-D schematically illustrates an embodiment of an attachment system for a rigid whisker.
Figure 4B:
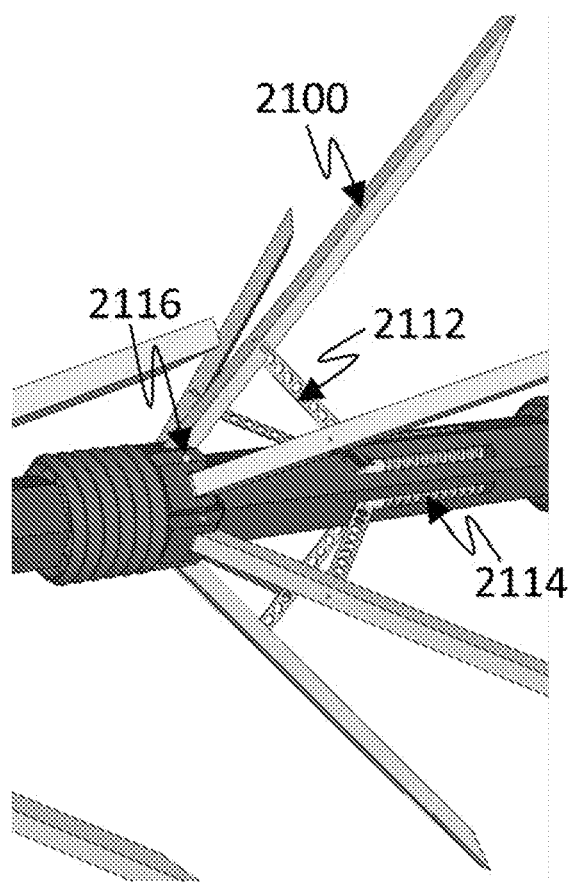
Figure 4C:
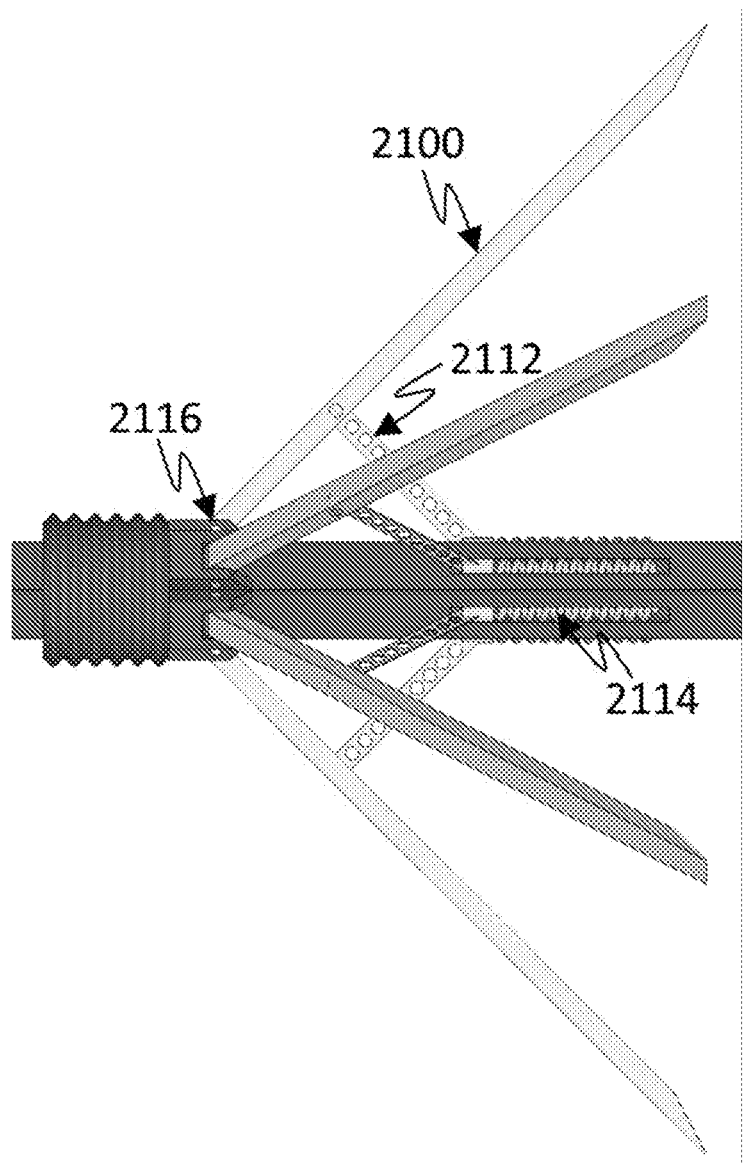
Figure 4D:
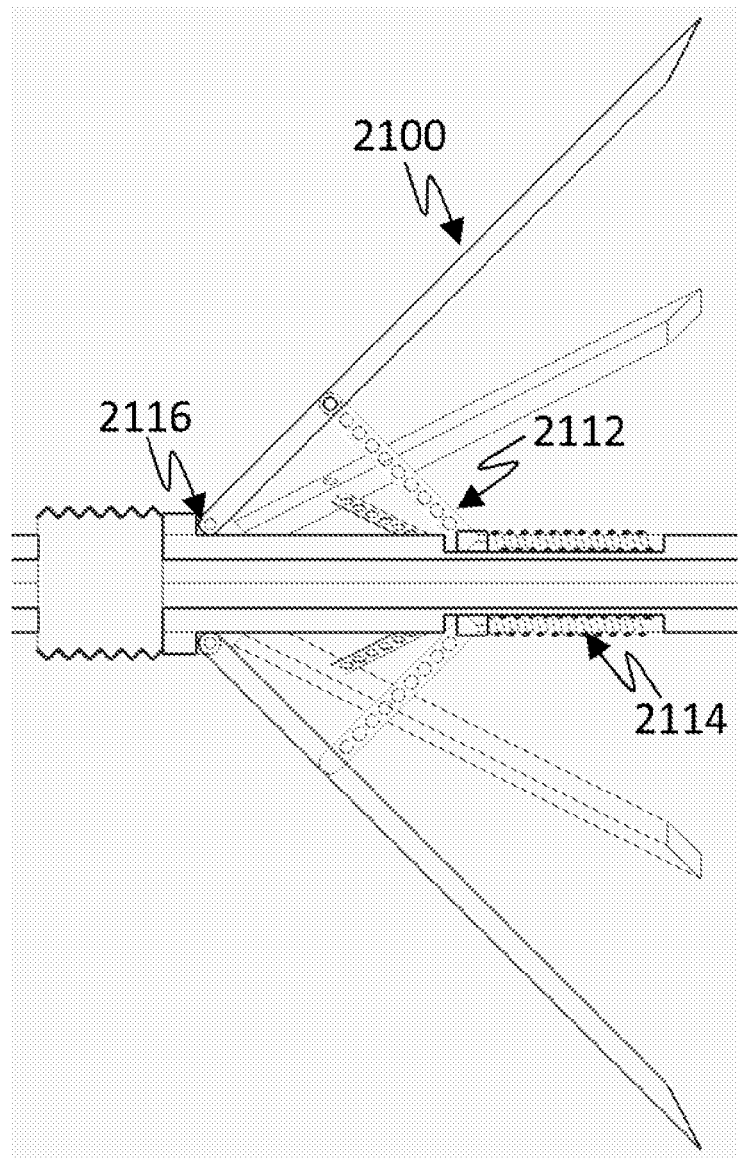
Figure 5A:
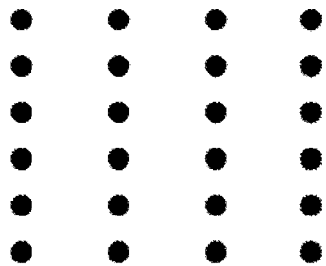
FIG. 5A-F schematically illustrates arrangements of whiskers on the surface of the core.
Figure 5B:
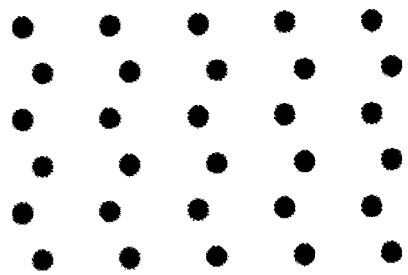
Figure 5C:
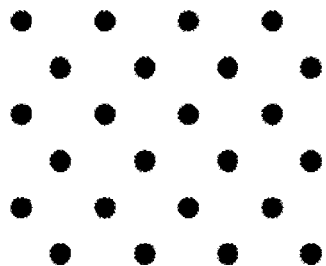
Figure 5D:
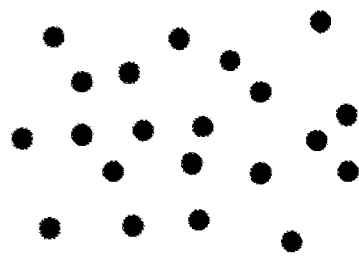
Figure 5E:
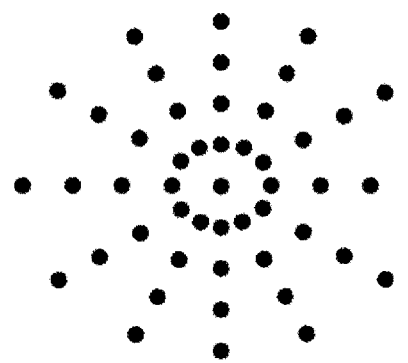
Figure 5F:
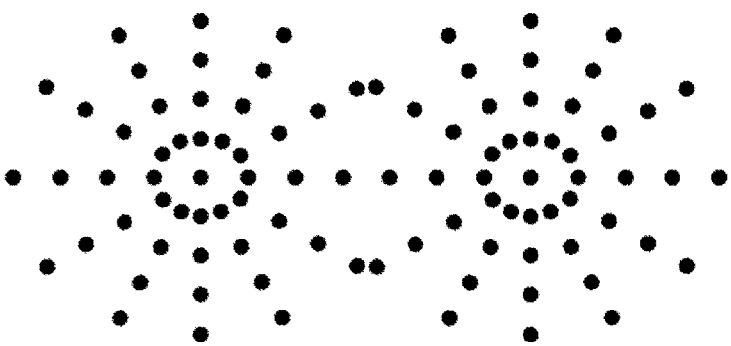

FIG. 4A shows a perspective view of an illustrative embodiment with 3 rows of rigid whiskers (2100). FIG. 4B shows a perspective close-up view of one row of whiskers (2100) in the illustrative embodiment of FIG. 4A. FIG. 4C shows a side view of one row of whiskers (2100) in the illustrative embodiment of FIG. 4A while FIG. 3D shows a cross-section side view of one row of whiskers (2100) in the illustrative embodiment of FIG. 4A.

In the illustrative embodiment of FIG. 4A-D, each rigid whisker (2100) (or clump of whiskers) is pivotally (2116) attached to a core section (2200) or a drive section (2300). Each rigid whisker (2100) is further attached by a rigid rod (2113) to a spring (2114). The rigid rod (2113) is pivotally (2111) attached at one end (the whisker end) to the rigid whisker (2100) and pivotally (2113) attached at the other end (the spring end) to a spring (2114). In this illustrative embodiment, the spring (2114) is housed within the core (2200) for core whiskers or within the drive sleeve (2300) for drive sleeve whiskers. A groove allows the rigid rod (2112) to slide along the drive sleeve (2300) for drive sleeve whiskers, as pushed or pulled by the spring (2114). In the embodiment shown, when there is no inward pressure (towards the section) on a rigid whisker (2100), the spring (2114) pushes the rigid whisker (2100) outward via the rigid rod (2112) until the spring end of the rigid rod (2112) has reached the end of its travel, at the end of the groove. If there is inward pressure on the rigid whisker (2100), it will pivot inward, pushing the rigid rod (2112) along the groove and away from its end stop, compressing the spring (2114), until the inward force due to the pressure is counterbalanced by the spring force. Such inward pressure can arise from the weight of the section (including objects attached to or on top of the section), from surfaces on opposite sides of the device constraining the outward movement of whiskers, or from an outward irregularity in the surface. Similarly, if a whisker encounters an inward irregularity in a surface, the spring (2114) will push the spring end of the rigid rod (2112) towards its end stop, pivoting the rigid whisker (2100) outward until the inward force due to the pressure is counterbalanced by the spring force or until the spring end of the rigid rod (2112) reaches its end stop. In the latter case, the whisker (2100) can lose contact with the surface. However, in general, other whiskers can take up the load and the device will remain stable.

A spring (2114) can be housed within a core or drive sleeve, within the head, within a tail, in a sleeve on a core or drive sleeve, in a sleeve on the head, in a sleeve on a tail, or in any conventional manner that allows the spring to In some embodiments, at least one rigid whisker (2100) can be attached to more than one spring, for non-limiting example, be attached to a forward-facing and a rearward-facing spring. Any combination of a forward-facing spring, a rearward-facing spring, a sideward facing spring and a diagonal spring can be attached to a rigid whisker.

A spring can be a helical coil spring, as shown, a conical spring, a leaf spring, a compression spring, an expansion spring, a torsion spring, a disc spring, a serpentine spring, a spiral spring, a mainspring, a negator constant force spring and any combination thereof.

A spring (2114) can be attached to a rigid rod (2112), to another spring (not shown) or directly to a rigid whisker (2100). It can have one or two fixed ends; the rigid rod (2112) can be attached to the spring (2114) at a central portion of the spring (2114).

In the exemplary embodiments of FIGS. 2 and 6, the whiskers are shown as flexible.

Whiskers can comprise a material selected from a group consisting of steel, stainless steel, spring steel, nylon, polypropylene, aluminum, fiberglass, carbon fiber reinforced polymer, polymer and any combination thereof. The polymer can be nylon, polyurethane, Acrylonitrile butadiene styrene (ABS) and any combination thereof.

Figure 6A:
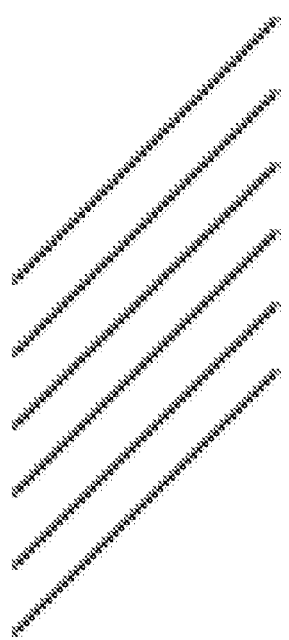
FIG. 6A schematically illustrates single whiskers.
Figure 6B:
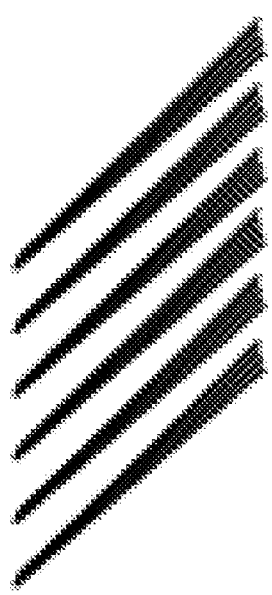
FIG. 6B schematically illustrates pluralities of whiskers in clumps.

As schematically illustrated in plan view in FIG. 5A-F, looking down on the bases of the whiskers, a section (2000) can comprise rows of whiskers (FIG. 5A), staggered rows of whiskers (FIG. 5B), intersecting rows of whiskers (FIG. 5C), randomly arranged whiskers (FIG. 5D) elliptical arrangements of whiskers (FIGS. 5E and 5F) and any combination thereof. The number of rows of whiskers can be in a range from 1 to 300. Each row of whiskers comprises at least two whiskers and can comprise up to 100 whiskers. The distance between any two positions in an arrangement can be the same as at least one other distance between any two positions or different from all other distances between two positions, As schematically illustrated in FIG. 6A-B, each position in an arrangement of whiskers can comprise a single whisker (FIG. 6A) or a plurality of whiskers (FIG. 6B). The number of whiskers need not be the same for different positions.

Figure 7A:
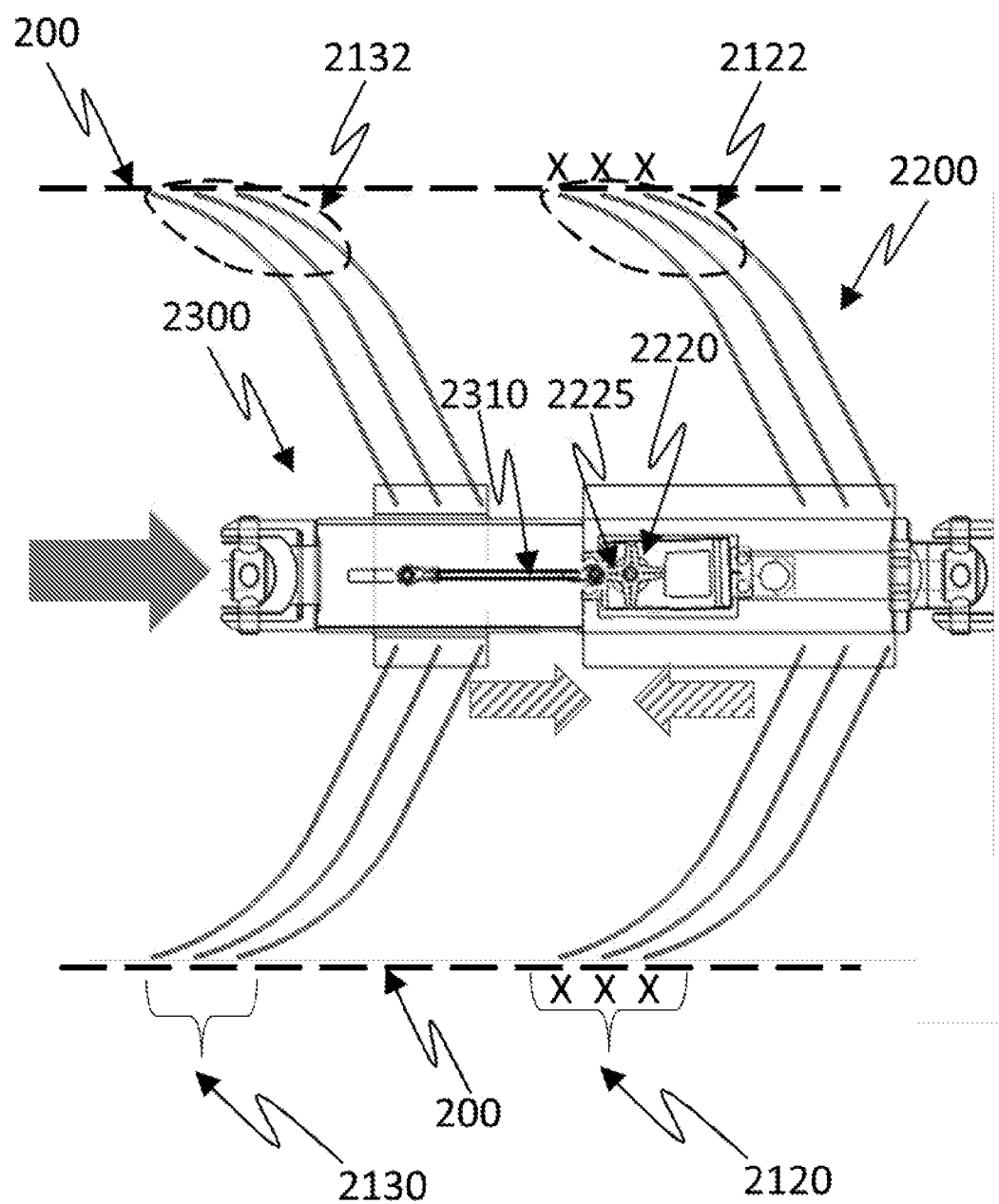
FIG. 7A-B schematically illustrates the device moving across a surface.
Figure 7B:
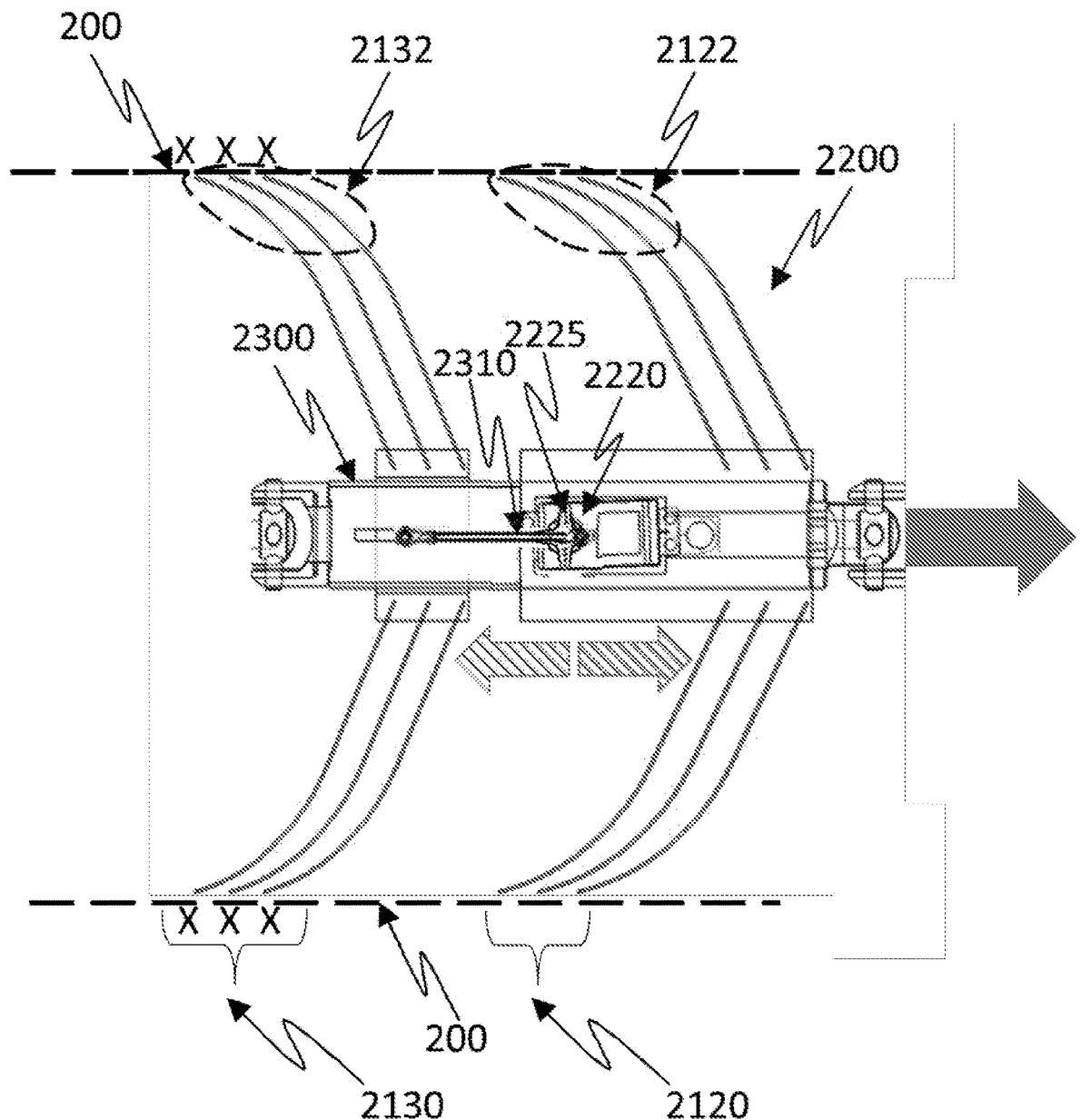

FIG. 7A-B schematically illustrate a possible means by which the device can move across a surface (200). The device is not limited by this possible means. In FIG. 7A, the drive sleeve (2300) is at its maximum rearward position relative to the core (2300). In the embodiment shown, this maximum rearward position occurs when the rod (2310) is at its rearmost position. The drive sleeve (2300) will then be moved forward (hatched arrows) relative to the core (2200). In the embodiment shown, this occurs as the rotor (2210) turns, moving the arm (2225) and therefore the rod (2310) forward relative to the core (2200). Friction between the core whisker free end portions (2122) of the core whiskers (2120) and any surface(s) (200, dashed lines) the core whisker free end portions (2122) are in contact with will substantially prevent the core whisker free end portions (2122) from moving backwards (Xs) while the sleeve whiskers free end portions (2132) will slide along the surface(s) (200) so the drive sleeve (2300) will move forward (grey arrow) relative to the surface(s) (200).

In FIG. 7B, the drive sleeve (2300) is at its forwardmost position relative to the core (2200). In the embodiment shown, this occurs when the rod (2310) is at its frontmost position. The drive sleeve (2300) will then be moved backward (hatched arrows) relative to the core (2200). In the embodiment shown, this occurs as the rotor (2210) turns, moving the arm (2225) and therefore the rod (2310) backward relative to the core (2200). Friction between the sleeve whisker free end portions (2132) and any surface(s) (200, dashed lines) the sleeve whisker free end portions (2132) are in contact with will substantially prevent the sleeve whisker tips (2130) from moving forwards (Xs) while the core whisker free end portions (2122) will slide along the surface (s) (200), so the core (2200) will move forward (grey arrow) relative to the surface(s) (200).

Therefore, the device (100) will move forward on both halves of the cycle, both when the drive sleeve (2200) is moving forward relative to the core (2300) and when the drive sleeve (2200) is moving backward relative to the core (2300).

The device is configured so that the general orientation of the whiskers (2120, 2130) is rearward, in the opposite direction from the direction of travel. Therefore, for the device to reverse direction, the general orientation of the whiskers (2120, 2130) must be reversed, so that the whiskers (2120, 2130) are generally oriented rearward from the new, reversed direction of travel.

Figure 8:
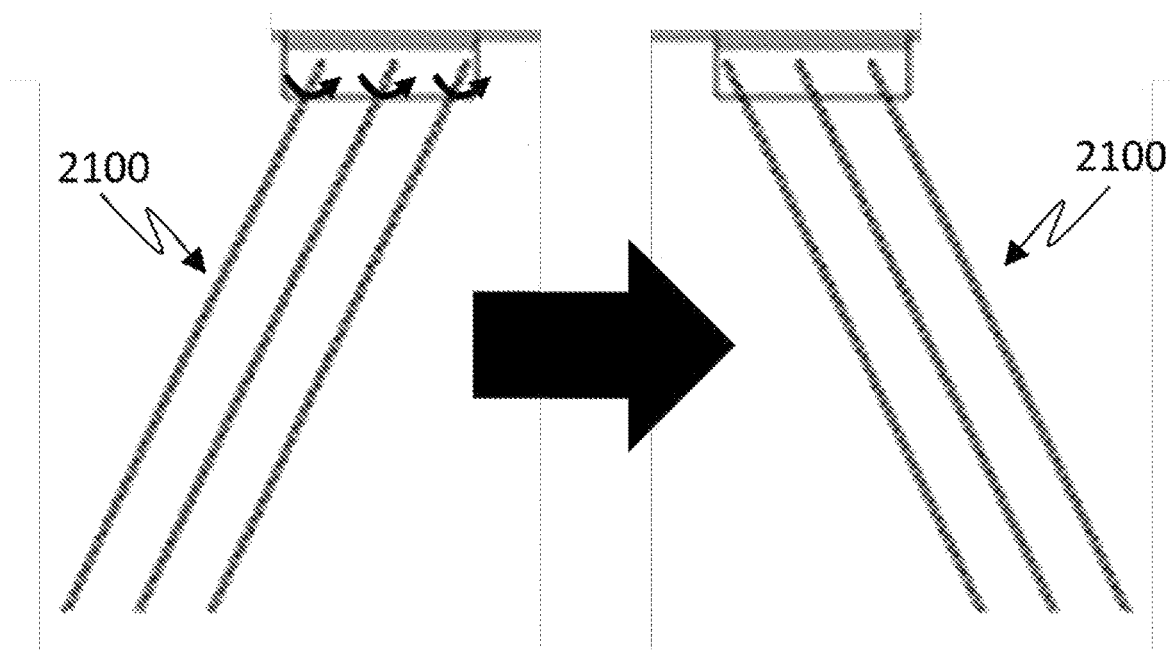
FIG. 8 schematically illustrates reversal of the direction of travel by means of a pivoting mechanism.

As schematically illustrated in FIG. 8, in some embodiments, reversal of the direction of travel can be by means of a pivoting mechanism (not shown) attached to the base (proximal) end of the whisker to be rotated. In some embodiments, each whisker (2100) (or clump of whiskers) comprises its own pivoting mechanism. In some embodiments, more than one whisker (2100) (or clump of whiskers) shares the same pivoting mechanism. Pivoting can be controlled by the processor.

A pivoting mechanism can control orientation of a flexible whisker, a rigid whisker and any combination thereof.

In some embodiments, the pivoting mechanism is a servo motor in mechanical connection with the base of a whisker. The servo motor can be attached directly to the base of a whisker or whiskers, or it can be connected to the base of the whisker or whiskers by a cable.

In some embodiments, pivoting can be by means of a magnetic mechanism in which the base of a whisker (or clump thereof) is held by at least one catch at an angle for propagation of the section in one direction. To reverse direction, the catch is released and an electromagnet draws the base of the whisker (or clump thereof) towards a second at least one catch. Once caught by the second at least one catch, the whisker (or clump thereof) is angled for propagation of the section in a second direction, preferably opposite to the first direction.

As disclosed above, if one or more of the bristles of the device of Zhelong and Wang rotates beyond a critical angle θ with respect to the pipe wall, it can buckle and flip through. If a sufficient number of bristles flip through, the brush core can be pushed back along the pipe. However, the failure of the bristle by buckling is an instability phenomenon, hence the flip through of a bristle is a quick and unstable process. Since the flip-through depends on the angle of the individual bristle with respect to the pipe wall, it is possible for a fraction of the bristles to flip through, for example, if a subset of bristles encounters an obstacle. Therefore, it is possible for the robot to be trapped in a pipe (if the fraction is such that the forward force from one subset of bristles equals the rearward force of the other subset of bristles) or to reverse spontaneously and unexpectedly (if the fraction is such that the forward force from one subset of bristles is less than the rearward force of the other subset of bristles). It is also not possible for an external operator to control reversal of direction of the device of Zhelong and Wang.)

This is a completely different phenomenon from the mechanically controlled and therefore deliberate and controllable reversal of the bristles as disclosed herein, which ensures reversal of all of the bristles in a controllable manner and enables control of reversal of direction by, for non-limiting example, a command received from an external source or by software in the robot's processor.

Figures 9A, 9B, 9C:
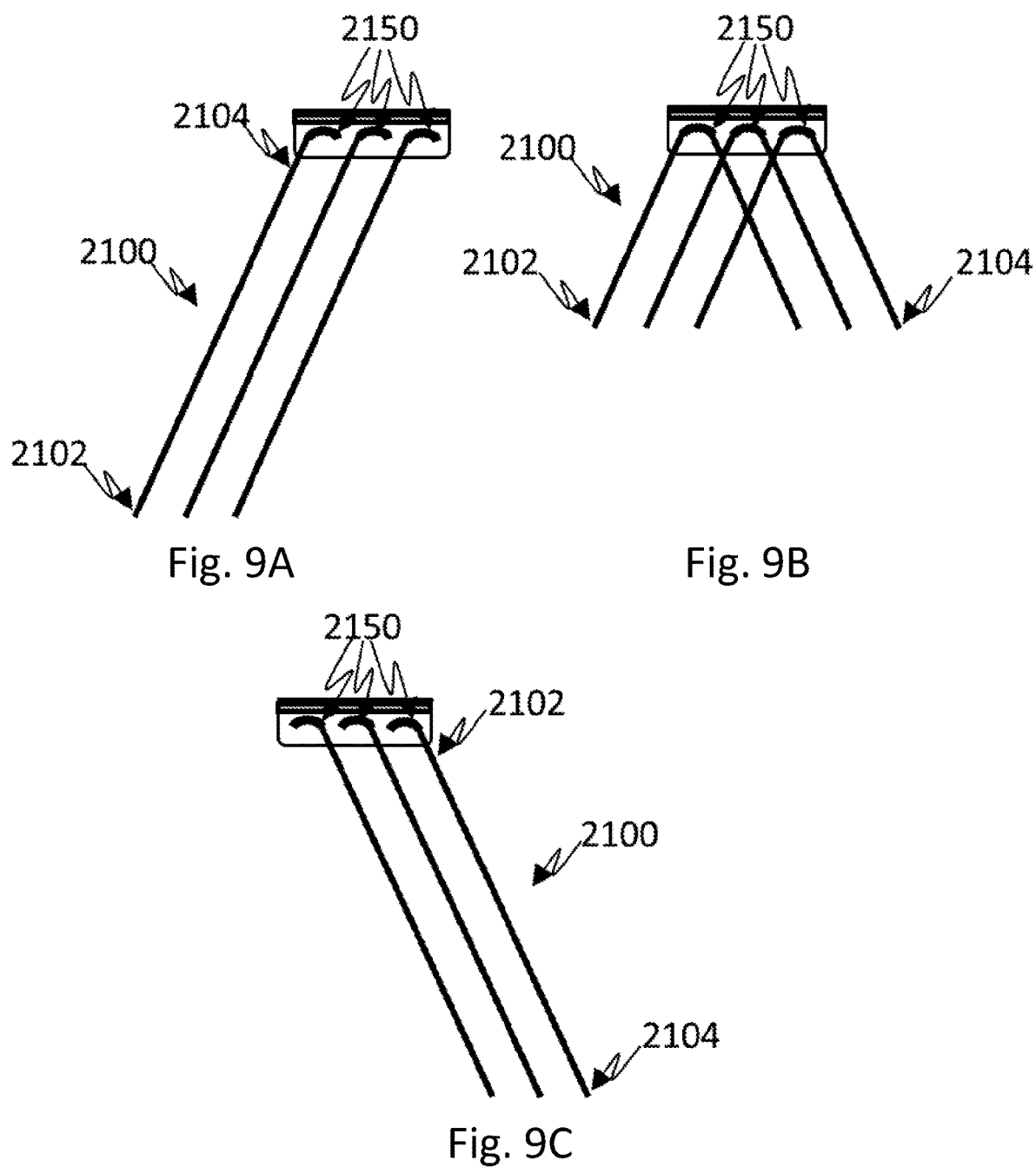

As schematically illustrated in FIGS. 9A-C and 10, in some embodiments, reversal of the direction of travel can be by means of exchanging base (2104) and free (distal) (2102) ends of a whisker (2100) or clump of whiskers (2100). FIGS. 9A to 9C schematically illustrate the overall process. The base (2104) of each whisker (or clump thereof; illustrated with a single whisker) (2100) is held by a curved whisker holder (2150). Before reversal (FIG. 9A), only the base (2104) of the whisker (2100) is held by the whisker holder (2150). To reverse the direction of travel of the device, as shown in FIG. 9B, the whisker holder (2150) pulls the whisker (2100) through the holder (2150) so that the base (2104) exits the opposite side of the whisker holder (2150) and the distal end (2102) is drawn towards the whisker holder (2150). As shown in FIG. 9C, at the end of the process, the former distal end (2104) has become the base end and the former distal end (2102) is now the base end, held by the whisker holder (2150).

Figure 10:
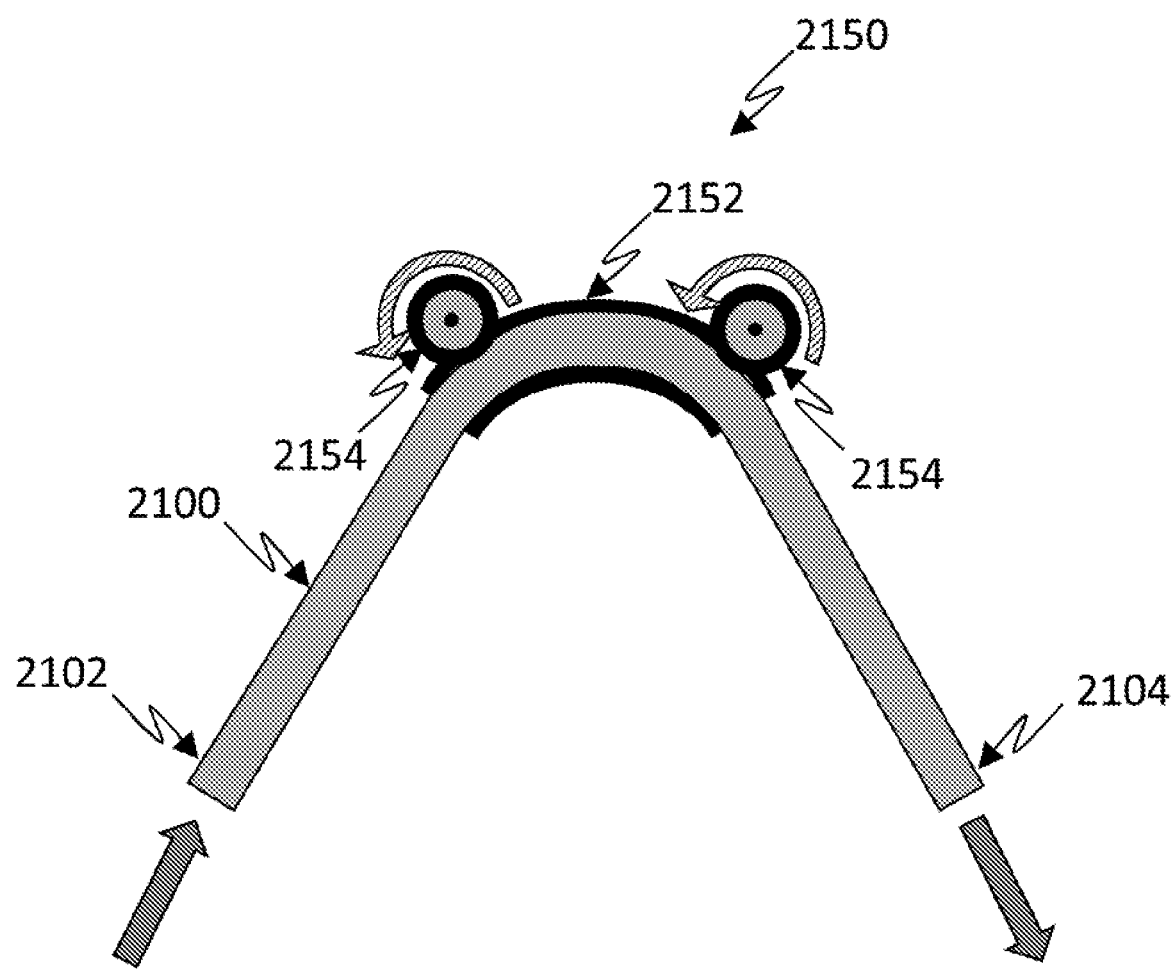

FIG. 10 schematically illustrates an embodiment of a mechanism for exchanging base (2104) and distal (2102) ends for reversal of the direction of motion. In this illustrative embodiment, the mechanism of the whisker holder (2150) comprises a curved race (2152) and at least one wheel (2154). The whisker holder (2150) can have a cross-section configured to allow the whisker (2100) to pass through it easily. For non-limiting example the cross-section can be the same shape as the whisker (2100), and between 1% and 10% larger in area than the whisker (2100).

The wheel(s) (2154) engage with the whisker (2100) and, as the wheel(s) (2154) are rotated, friction between the wheel(s) (2154) and the whisker (2100) draws the whisker (2100) through the race (2152). In the illustrative exemplary embodiment of FIG. 10, if the wheels rotate counterclockwise (hatched arrows) the direction of motion of the whisker (2100) is left-to-right (grey arrows).

An advantage of reversing whisker base and free ends over pivoting a whisker is that, unlike pivoting, the diameter of the device does not increase during the reversing process, thus increasing the probability of a successful reverse and reducing the force exerted by the whiskers on the surroundings. If the reversing process is carried out sequentially, preferably starting from the front (where a line from the free end towards the base of a whisker points generally towards the front), then the overall diameter of the device does not change significantly during the reversing process, so that the device remains in a substantially stable position during the reversing process and does not fall towards the surface beneath it.

FIGS. 11A-D and 12A-C schematically illustrate embodiments of mechanisms for changing the direction of motion of the device (1000) by changing which whiskers contact the surface(s).

In the "push-pull" embodiment of FIGS. 11A-D, the whisker (2100A, 2100B) bases are pivotally (2162) attached (see FIG. 11A) to a carrier (2160) slidable along a section part (3200) that can be a drive sleeve (2200) or a core (2300). End stops (3210) prevent the carrier (2160) from moving beyond the end of the section part (3200). In this embodiment, a roller chain or pair of roller chains (2166) pulled by a motor (not shown) move the carrier (2160) along the section part (3200). In other embodiments, the motor can pull a roller chain, a chain, a rope, a cord, a belt and any combination thereof, or any other conventional means of connecting a driving motor to a driven object. When the carrier (2160) is at an end of the section part (3200) (FIGS. 11A and 11B), the set of whiskers (2100A, 2100B) at that end of the section part (3200) is active, pivoted outward, and the set of whiskers (2100B, 2100A) at the other end of the section part (3200) is close to the section part (3200), in this embodiment, resting against the carrier (2160).

Figure 11A:
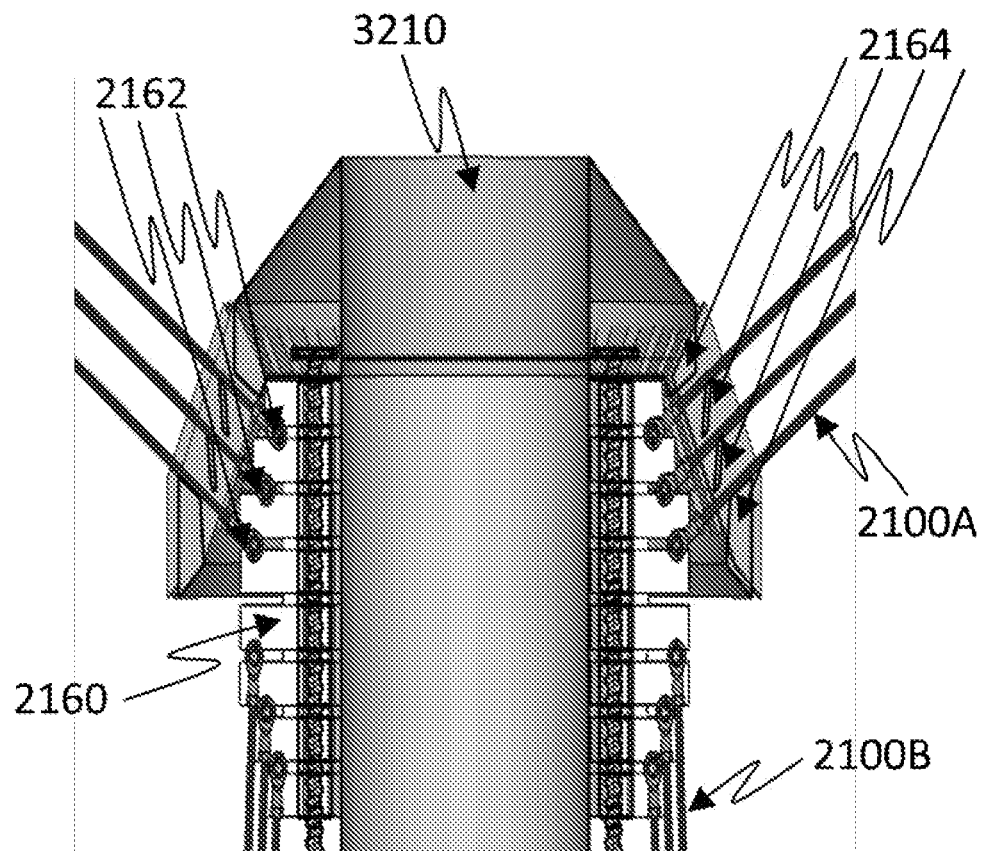

FIG. 11A shows an enlarged view of the carrier (2160). The pivots (2162) at the bases of the whiskers are shown.

Each whisker (2100A, 2100B) passes between two pivoting studs (2164). As the carrier (2160) passes down the section part (3200), each pair of pivoting studs (2164) causes the whisker (2100A, 2100B) that passes between them to pivot. As the carrier (2160) moves away from an end stop (3210), the pivoting studs (2164) induce the whisker (2100A, 2100B) to pivot inward, (white arrows, FIG. 11B), and, as the carrier (2160) moves toward an end stop (3210), the pivoting studs (2164) induce the whisker (2100A, 2100B) to pivot outward, (black arrows, FIG. 11B), thus changing the set of whiskers contacting the surface(s) and changing the direction of travel of the device (1000).

Figure 11B:
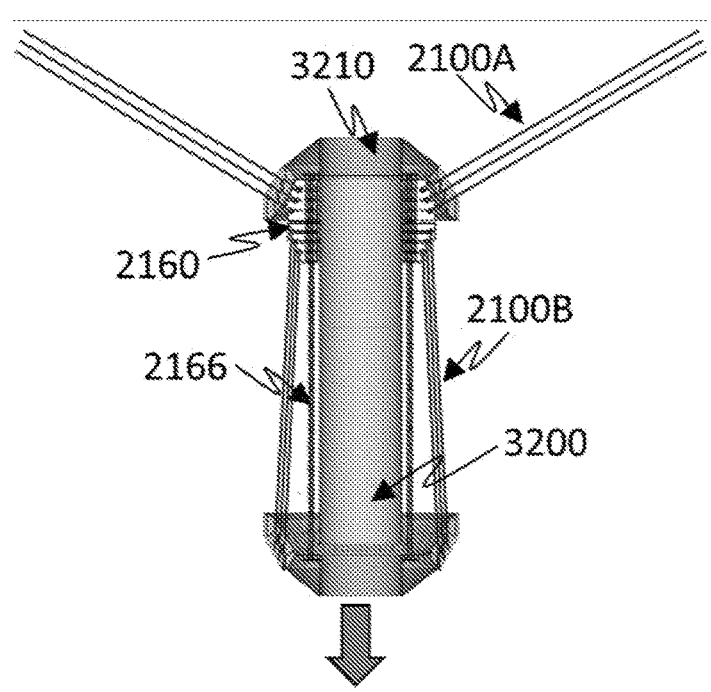

FIG. 11B shows the push-pull embodiment with the carrier (2160) at the top end of the section part (3200), against the top end stop (3210), The top end whiskers (2100A) are extended and can contact a surface (not shown), while the bottom end whiskers (2100B) are against the top end stop (3210). The device (1000) can travel in the downward direction (dark grey arrow).

Figure 11C:
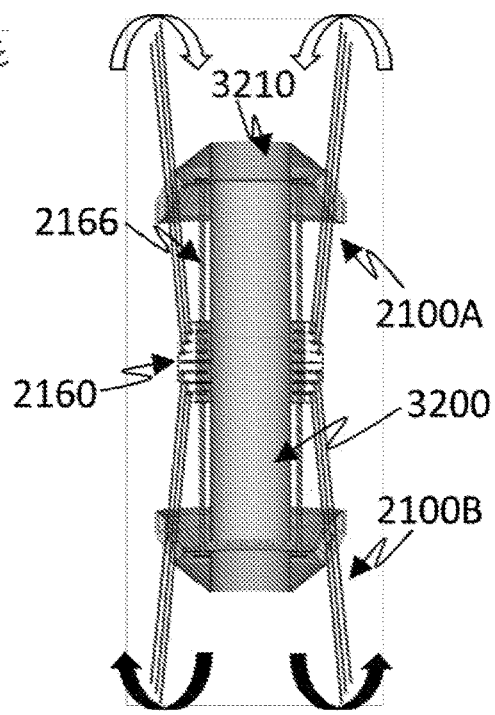

FIG. 11C shows the push-pull embodiment during a change of movement direction, with the carrier (2160) near the middle of the section part (3200). The top end whiskers (2100A) are pivoting inward (white arrows) while the bottom end whiskers (2100B) are pivoting outward (black arrows). At this point, the section part (3200) is unsupported. In preferred embodiments, support for a section (2000) can be provided during a direction change by changing direction of motion in a patterned fashion so that, during the direction change, an unsupported part is supported by adjacent parts. For non-limiting example, a "wave" of direction change can pass down a device (1000), with only one portion of a section (2000) changing direction at any time. In another non-limiting example, alternate sections (2000) can change direction, or every nth section, or n sections out of m, where m is greater than n; or a number of drive sleeve (2200) can change direction, followed (or preceded by) a number of cores (2300), or any combination thereof.

Figure 11D:
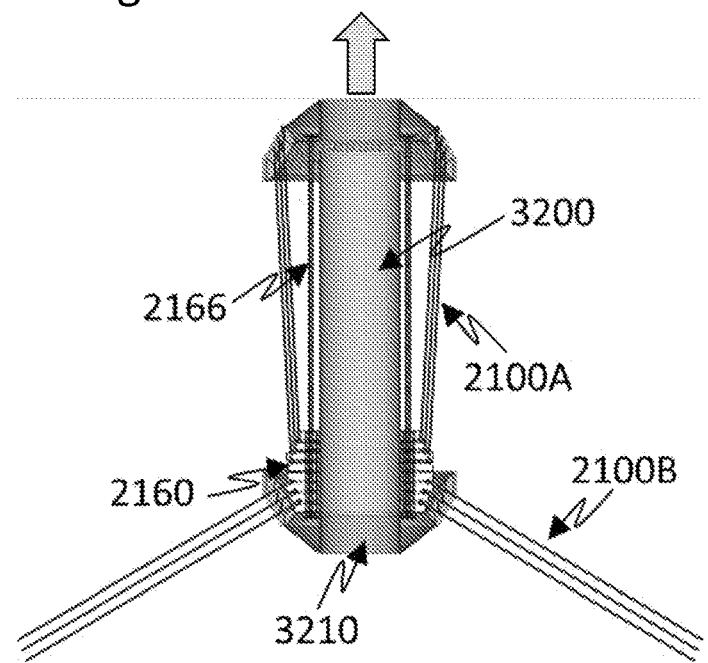

FIG. 11D shows the push-pull embodiment with the carrier (2160) at the bottom end of the section part (3200), against the bottom end stop (3210), The bottom end whiskers (2100B) are extended and can contact a surface (not shown), while the top end whiskers (2100A) are against the bottom end stop (3210). The device (1000) can travel in the upward direction (light grey arrow).

In the "umbrella" embodiment of FIGS. 12A-D, the whisker (2100A, 2100B) bases are pivotally (2172) attached (see FIG. 12A) to a fixed base (2170) at an end of the carrier (2160). A slider (2180), slidable along a section part (3200) that can be a drive sleeve (2200) or a core (2300), is connected via a slider bar (2176) to a base portion of at least one whisker (2100A, 2100B). In this embodiment, a roller chain or pair of roller chains (2166) pulled by a motor (not shown) move the slider (2180) along the section part (3200). In other embodiments, the motor can pull a roller chain, a chain, a rope, a cord, a belt and any combination thereof, or any other conventional means of connecting a driving motor to a driven object.

When the slider (2180) is at the upper end of its travel (FIGS. 12A, 12B), the set of whiskers (2100A) at that end of the section part (3200) is active, pivoted outward, and the set of whiskers (2100B) at the other end of the section part (3200) is close to the section part (3200), in this embodiment, adjacent to the fixed base (2170).

Figure 12A:
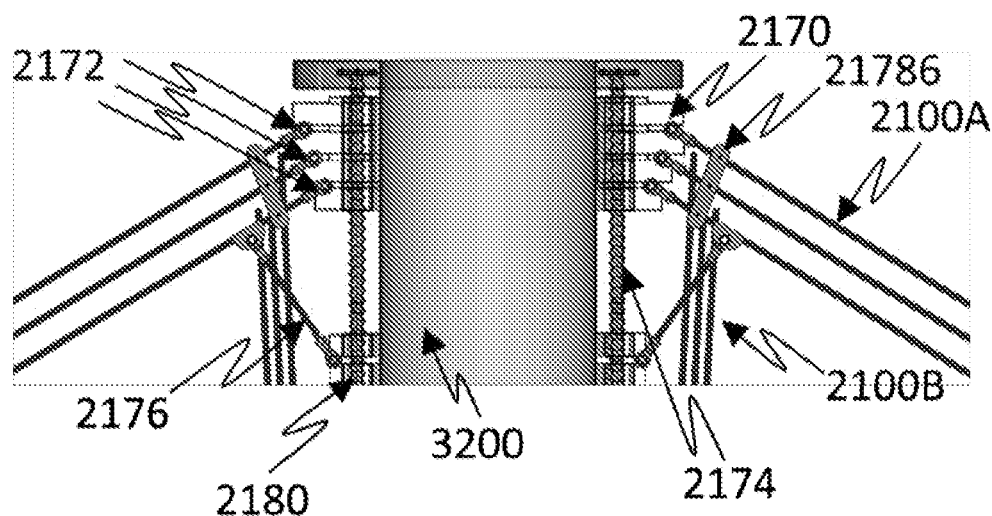

FIG. 12A shows an enlarged view of an end of the section part (3200). The pivots (2172) at the bases of the whiskers are shown. Each set of whiskers (2100A, 2100B) is connected together by a connector bar (2178) that keeps the whiskers (2100A, 2100B) in a set pointing in the same direction.

At least one whisker (2100A, 2100B) in each set is connected to the slider (2180) via a slider bar (2176). As the slider (2180) passes down the section part (3200), each slider bar (2176) pulls the whiskers (2100A, 2100B) in the set to which it is attached, causing them to pivot. As the slider (2180) moves away from an end of the section part (3200), the slider bar (2180) induces the whiskers (2100A, 2100B) to pivot inward, (white arrows, FIG. 12B), and, as the slider (2180) moves toward an end of the section part (3200), the slider bar (2180) induces the whiskers (2100B, 2100A) to pivot outward, (black arrows, FIG. 12B), thus changing the set of whiskers contacting the surface(s) and changing the direction of travel of the device (1000).

Figure 12B:
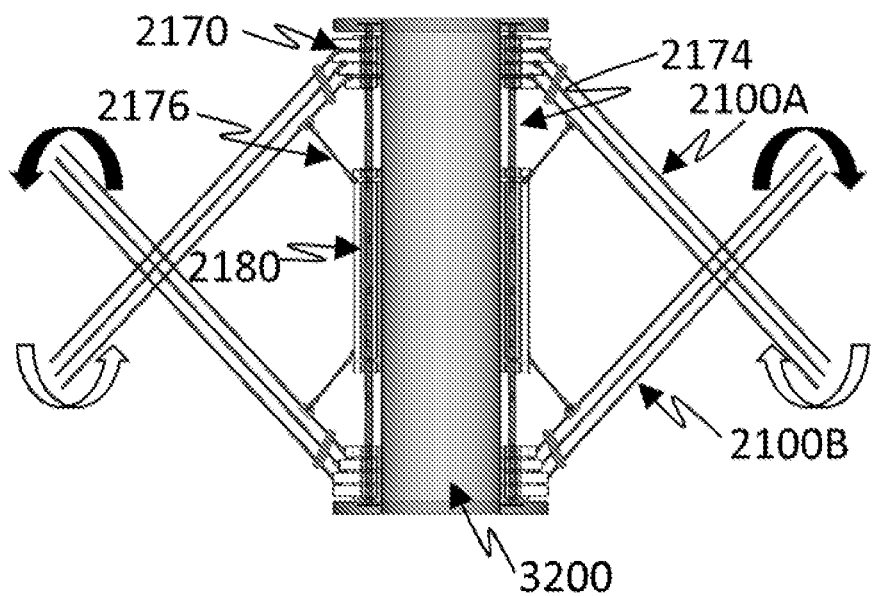

FIG. 12B shows the umbrella embodiment with the slider (2180) at the top end of its travel, The top end whiskers (2100A) are extended and can contact a surface (not shown), while the bottom end whiskers (2100B) are adjacent to the top fixed base (2170). The device (1000) can travel in the upward direction (light grey arrow).

Figure 12C:
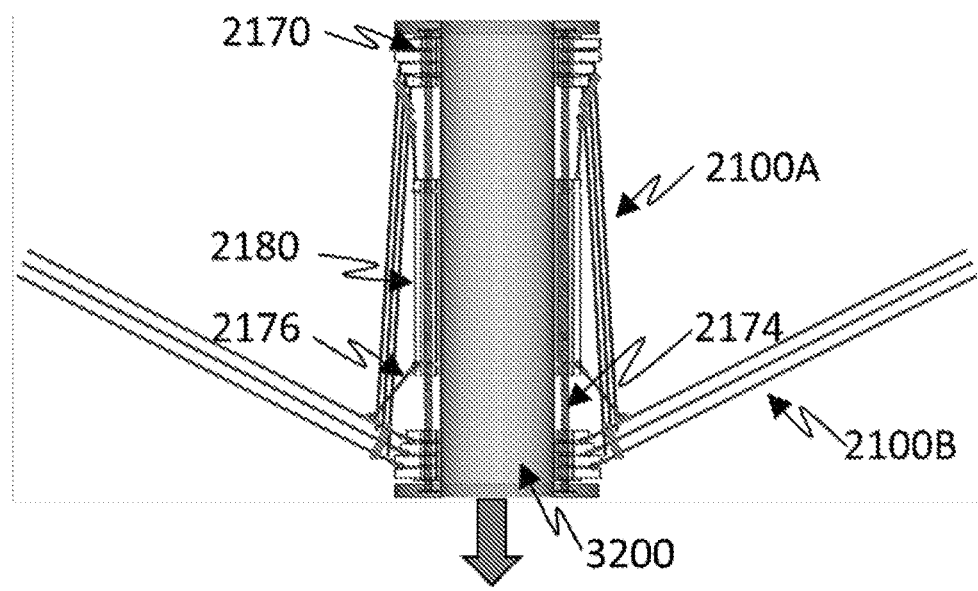

FIG. 12C shows the umbrella embodiment during a change of movement direction, with the slider (2180) near the center of its travel. The top end whiskers (2100A) are pivoting inward (white arrows) while the bottom end whiskers (2100B) are pivoting outward (black arrows). At this point, the section part (3200) is unsupported. In preferred embodiments, support for a section (2000) can be provided during a direction change by changing direction of motion in a patterned fashion so that, during the direction change, an unsupported part is supported by adjacent parts. For non-limiting example, a "wave" of direction change can pass down a device (1000), with only one portion of a section (2000) changing direction at any time. In another non-limiting example, alternate sections (2000) can change direction, or every nth section, or n sections out of m, where m is greater than n; or a number of drive sleeve (2200) can change direction, followed (or preceded by) a number of cores (2300), or any combination thereof.

FIG. 12D shows the umbrella embodiment with the slider (2180) at the bottom of its travel, The bottom end whiskers (2100B) are extended and can contact a surface (not shown), while the top end whiskers (2100A) are adjacent to the bottom fixed base (2170). The device (1000) can travel in the downward direction (dark grey arrow).

Any other conventional mechanism for changing a direction of a whisker can be used.

Figure 13:
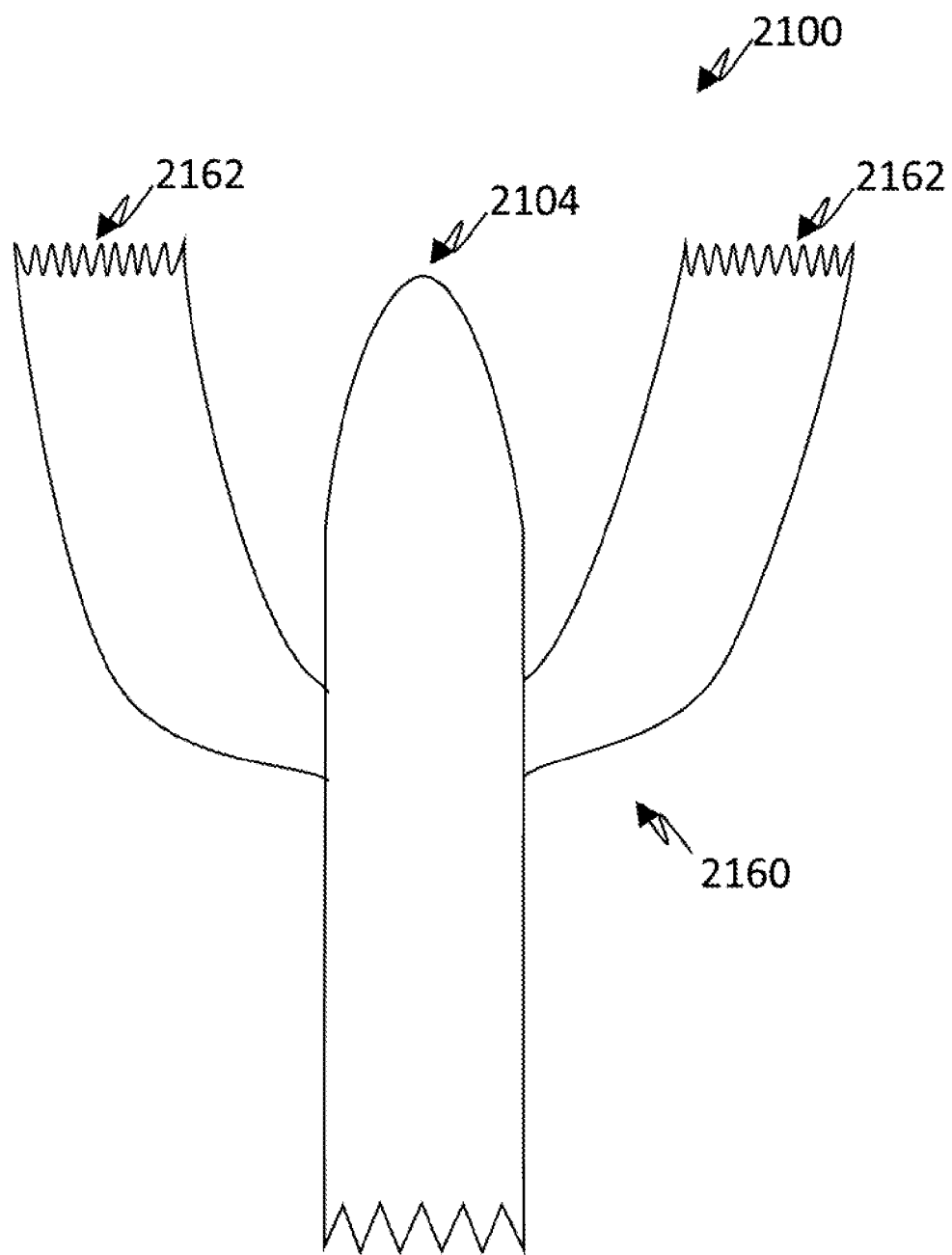
FIGS. 13, 14A-B and 15A-B schematically illustrate pressure spreading tips for a whisker.

As schematically illustrated in FIG. 13, in some embodiments, at least one whisker (2100) has at least one pointed distal end (2104) that can "dig in" to a hard surface to minimize slipping of a stationary whisker free end portion (2122, 2132, see X's in FIGS. 7A-7B) on the hard surface.

In some embodiments, at least one whisker (2100) additionally comprises at least one pressure spreader (2160) to prevent a whisker free end portion (2122, 2132) from sinking too far in a soft surface (200). In preferred embodiments, when there is no pressure on the distal portion of the whisker (2100), the distal end (s) (2162) of the at least one pressure spreader (2160) extend beyond the distal tip of the whisker to which the at least one pressure spreader (2160) is attached. When pressure is applied to the whisker (2100) by a surface (200, see FIG. 2), the distal end (s) (2162) of the at least one pressure spreader (2160) will move distally. This can occur because the material of the at least one pressure spreader (2160) compresses, because the material of the at least one pressure spreader (2160) moves laterally (typically away from the longitudinal axis of the whisker free end portion (2122, 2132)), because the entire at least one pressure spreader (2160) moves proximally relative to the whisker, and any combination thereof. When the pressure is sufficient for the tip of the whisker (2100) to contact the surface (200, not shown), if the surface (200) is hard enough (and/or the whisker (2100) tip is blunt enough), substantially all of the pressure will be transmitted through the whisker (2100) tip; the whisker will function as though the at least one pressure spreader (2160) were not present.

If the surface "gives" under the pressure, then some of the pressure will be transferred from the whisker (2100) to the at least one pressure spreader (2160), until the pressure is substantially the same across the at least one pressure spreader (2160) and the whisker (2100) tip, thus significantly reducing the pressure on the surface and thereby reducing the possibility of damage to the surface (200), the whisker (2100) penetrating the surface, the whisker (2100) becoming stuck in the surface (200) and any combination thereof.

In the exemplary embodiment shown, the pressure spreader (2160) comprises at least one brush, which can be substantially annular in cross-section or can comprise individual tufts surrounding a whisker (2100) tip. When pressure is exerted on the distal end of the at least one pressure spreader (2160), the fibers in the brush move, typically laterally, bend or both move and bend, thus moving the distal ends of the brush fibers proximally until the pressure is substantially the same across the distal end of the at least one pressure spreader (2160) and the whisker (2100) tip, thus significantly reducing the pressure on the surface and thereby reducing the possibility of damage to the surface (200), the whisker (2100) penetrating the surface, the whisker (2100) becoming stuck in the surface (200) and any combination thereof.

Figures 14A, 14B:
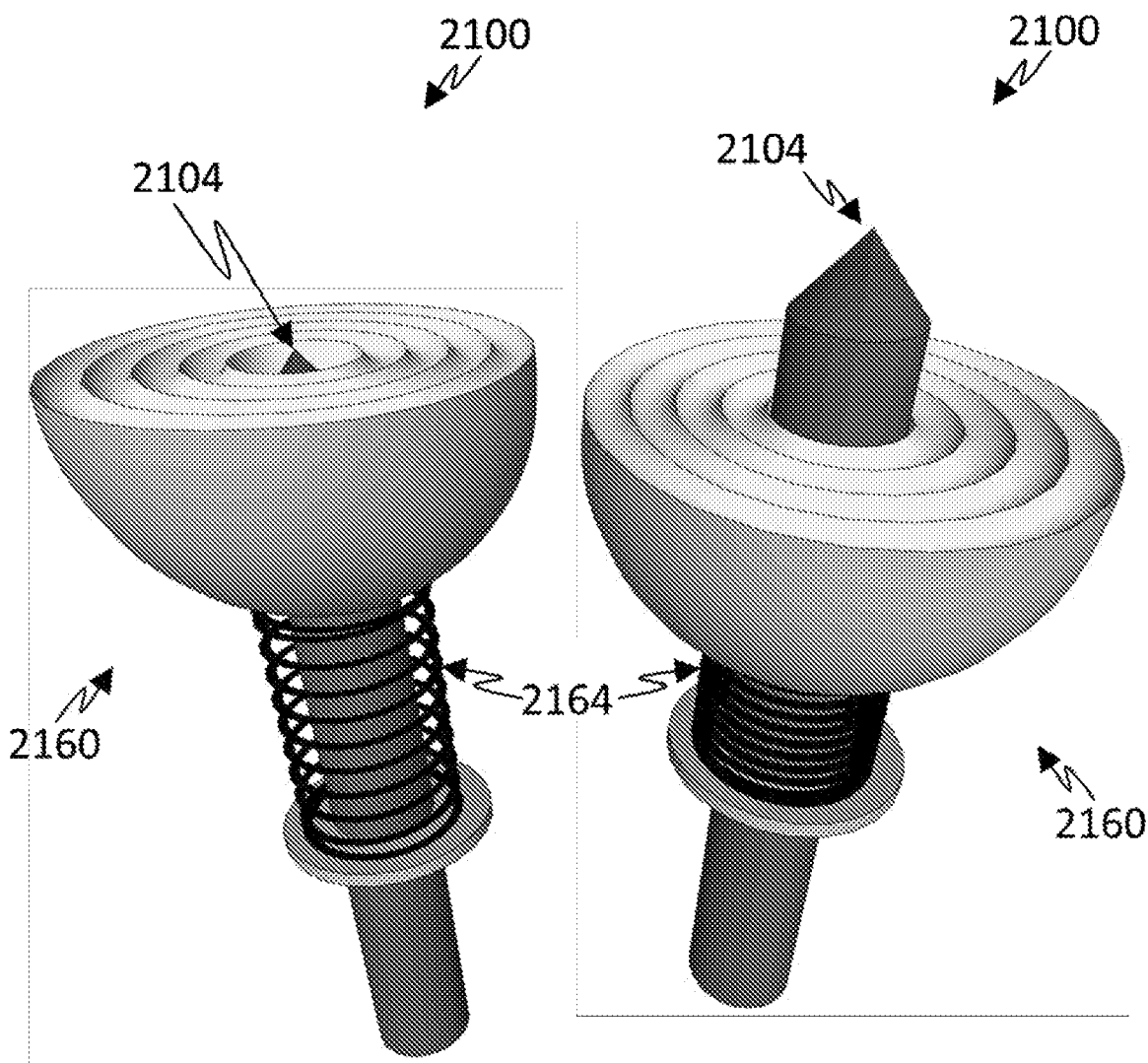
Figures 15A, 15B:
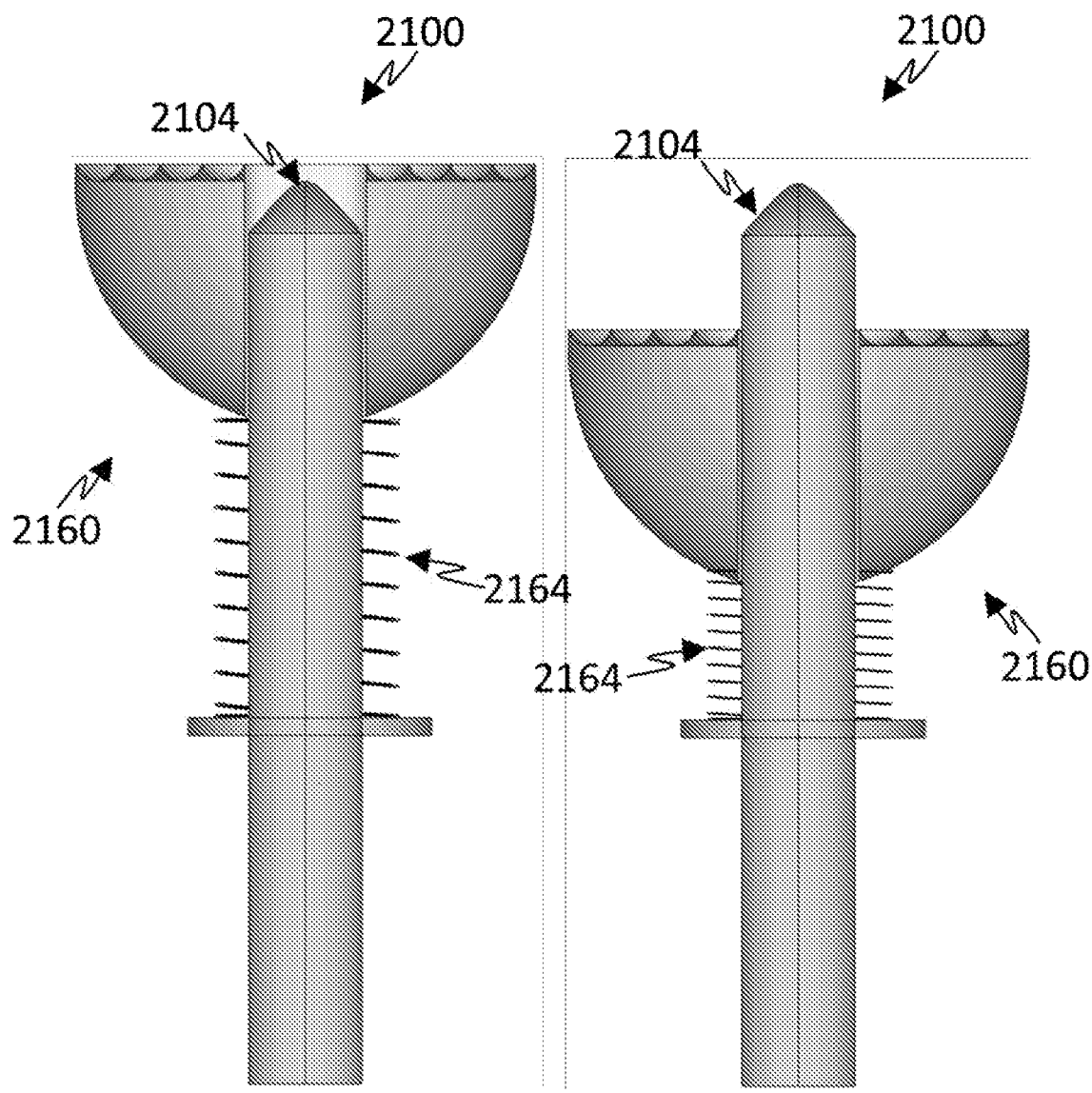

In some embodiments, at least one pressure spreader (2160) can comprise a soft or foam-like material with compressibility configured to prevent damage to a surface. The compressibility can depend on the amount of bending expected in the whiskers, the distance between whiskers, the weight of the section to which the whiskers are attached, As shown in FIGS. 14A-B and FIGS. 15A-B, in some embodiments, at least one pressure spreader (2160) can comprise a spring (2164), typically in its proximal region. FIG. 14A-B shows an exterior view, while FIG. 15A-B shows a cross-section of the embodiment of the spreader (2160). FIGS. 14A and 15A show the spring (2164) in its uncompressed state, while FIGS. 14B and 15B show the spring (2164) in a compressed state. With no pressure on the pressure spreader (2160), the spring (2164) is uncompressed (FIG. 14A and FIG. 15A), When pressure is exerted on the distal end of the at least one pressure spreader (2160), the spring (2164) compresses (FIG. 14B and FIG. 15B), moving the at least one pressure spreader (2160) proximally until the pressure is substantially the same across the distal end of at least one pressure spreader (2160) and the whisker (2100) tip, thus significantly reducing the pressure on the surface (the force on the whisker (2100) being unaffected by the area across which it is spread) and thereby reducing the possibility of damage to the surface (200), damage to the whisker (2100) penetration of the surface (200) by the whisker (2100), the whisker (2100) becoming stuck in the surface (200) and any combination thereof.

It should be noted that any combination of a soft material, a foam-like material, a compressible material, a brush and a spring can be used in at least one pressure spreader (2160) and that all the pressure spreaders (2160) can be the same or at least two pressure spreaders (2160) can be different, either in that they use a different combination of elements, in that at least one element has different properties, and any combination thereof.

The invention claimed is:

1. A device (100) for moving across a surface (200) comprising:
    a. at least one section (2000), said section (2000) having a main longitudinal axis (2500), said section (2000) comprising a core (2200) and at least one drive sleeve (2300), the at least one drive sleeve (2300) reversibly movable relative to the core (2200) in a direction of the main longitudinal axis (2500);
    b. for each said at least one section (2000), at least one row of core whiskers (2130) in mechanical communication with the core (2200);
    c. for each said at least one section (2000), at least one row of sleeve whiskers (2120) in mechanical communication with the drive sleeve (2300);
    wherein each said at least one section (2000) comprises a rotor (2220) in mechanical connection with the core (2200) and the at least one drive sleeve (2300), said rotor (2220) configured to reversibly move the drive sleeve (2300) relative to the core (2200);
    further wherein, for each said at least one section (2000), said core (2200) passes at least partly through said at least one drive sleeve (2300).

2. The device (100) of claim 1, wherein each member of a group consisting of said at least one row of core whiskers and said at least one row of sleeve whiskers comprises at least one whisker at at least one position.

3. The device (100) of claim 1, additionally comprising a rod, the rod connected at a rod drive end with the rotor (2220) and the rod connected at a rod core end with the core (2200).

4. The device (100) of claim 1, wherein the at least one section (2000) additionally comprises a rocking mechanism, the rocking mechanism configured to displace either the rotor (2220) or the rotor (2220) and a motor in a direction perpendicular to the main longitudinal axis (2500) of the at least one section (2000).

5. The device (100) of claim 1, additionally comprising at least one arm configured to grasp at least one object.

6. The device (100) of claim 1, wherein at least one of the following is true:
    a. for each section (2000), for each core whisker in said at least one row of core whiskers, a free end of said core whisker is closer to the core end of said section (2000) than a base end of the same core whisker and, for each sleeve whisker in said at least one row of sleeve whiskers, a free end of said sleeve whisker is closer to the core end of said section (2000) than a base end of the same sleeve whisker; and
    b. for each section (2000), for each core whisker in said at least one row of core whiskers, a free end of said core whisker is closer to the drive end of said section (2000) than a base end of the same core whisker and, for each sleeve whisker in said at least one row of sleeve whiskers, a free end of said sleeve whisker is closer to the drive end of said section (2000) than a base end of the same sleeve whisker.

7. The device (100) of claim 1, additionally comprising at least one mechanism for reversing a direction of at least one member of a group consisting of said at least one row of core whiskers and said at least one row of sleeve whiskers.

8. The device (100) of claim 7, wherein the at least one mechanism for reversing the direction is selected from a group consisting of a pivoting mechanism, a whisker end reversing mechanism, and any combination thereof.

9. The device (100) of claim 1, additionally comprising a steering mechanism.

10. A method for moving across a surface (200) comprising:
   a. providing a device (100) for moving across a surface (200) comprising:
      i. at least one section (2000), said section (2000) having a main longitudinal axis (2500), said section (2000) comprising a core (2200) and at least one drive sleeve (2300), the at least one drive sleeve (2300) reversibly movable relative to the core (2200) in a direction of the main longitudinal axis (2500);
      ii. for each said at least one section (2000), at least one row of core whiskers in mechanical communication with the core (2200); iii. for each said at least one section (2000), at least one sleeve row of whiskers in mechanical communication with the drive sleeve (2300);
   b. placing said device (100) on a surface (200); and
   c. activating said device (100);
   wherein each said at least one section (2000) comprises a rotor (2220) in mechanical connection with the core (2200) and the at least one drive sleeve (2300), the rotor (2220) configured to reversibly move the drive sleeve (2300) relative to the core (2200);
   further wherein, for each said at least one section (2000), said core (2200) passes at least partly through said at least one drive sleeve (2300).

11. The method of claim 10, additionally comprising a step of providing each member of a group consisting of said at least one row of core whiskers and said at least one row of sleeve whiskers comprising at least one whisker at at least one position.

12. The method of claim 10, additionally comprising steps of providing the at least one section (2000) comprising a rocking mechanism, and the rocking mechanism displacing either the rotor (2220) or the rotor (2220) and a motor in a direction perpendicular to the main longitudinal axis (2500) of the at least one section (2000).

13. The method of claim 10, additionally comprising a step of providing at least one arm.

14. The method of claim 10, additionally comprising a step of providing at least one mechanism for reversing a direction of at least one member of a group consisting of said at least one row of core whiskers and said at least one row of sleeve whiskers.

15. The method of claim 14, additionally comprising a step of selecting the at least one mechanism for reversing the direction from a group consisting of a pivoting mechanism, a whisker end reversing mechanism, and any combination thereof.

16. The method of claim 10, additionally comprising a step of providing a steering mechanism.

17. A device (100) for moving across a surface (200) comprising:
   a. at least one section (2000), said section (2000) having a main longitudinal axis (2500), said section (2000) comprising a core (2200) and at least one drive sleeve (2300), the at least one drive sleeve (2300) reversibly movable relative to the core (2200) in a direction of the main longitudinal axis (2500);
   b. for each said at least one section (2000), at least one row of core whiskers (2130) in mechanical communication with the core (2200);
   c. for each said at least one section (2000), at least one row of sleeve whiskers (2120) in mechanical communication with the drive sleeve (2300);
   wherein, for each said at least one section (2000), said reversible movement between said at least one drive sleeve (2300) and said core (2200) is effected by a drive mechanism selected from a group consisting of a rotor (2220) in mechanical connection with the core (2200) and the at least one drive sleeve (2300), said rotor (2220) configured to reversibly move the drive sleeve (2300) relative to the core (2200); a motor, a cam, a screw mechanism, a stepper motor and any combination thereof.

18. The device (100) of claim 17, wherein power for the drive mechanism is provided by a power source contained within said at least one section (2000); and wherein each member of a group consisting of said at least one row of core whiskers and said at least one row of sleeve whiskers comprises at least one whisker at at least one position.

19. The device (100) of claim 17, additionally comprising a rod, the rod connected at a rod drive end with the rotor (2220) and the rod connected at a rod core end with the core (2200).

20. A method for moving across a surface (200) comprising:
   a. providing a device (100) for moving across a surface (200) comprising:
      i. at least one section (2000), said section (2000) having a main longitudinal axis (2500), said section (2000) comprising a core (2200) and at least one drive sleeve (2300), the at least one drive sleeve (2300) reversibly movable relative to the core (2200) in a direction of the main longitudinal axis (2500);
      ii. for each said at least one section (2000), at least one row of core whiskers in mechanical communication with the core (2200);
      iii. for each said at least one section (2000), at least one sleeve row of whiskers in mechanical communication with the drive sleeve (2300);
   b. placing said device (100) on a surface (200); and
   c. activating said device (100);
   wherein, for each said at least one section (2000), said reversible movement between said at least one drive sleeve (2300) and said core (2200) is effected by a drive mechanism selected from a group consisting of a rotor (2220) in mechanical connection with the core (2200) and the at least one drive sleeve (2300), said rotor (2220) configured to reversibly move the drive sleeve (2300) relative to the core (2200); a motor, a cam, a screw mechanism, a stepper motor and any combination thereof;
   further wherein power for the drive mechanism is provided by a power source contained within said at least one section (2000).

* * * * *